US010845823B2

(12) United States Patent
Burghardt et al.

(10) Patent No.: US 10,845,823 B2
(45) Date of Patent: Nov. 24, 2020

(54) VEHICLE NAVIGATION SYSTEM

(71) Applicant: Joby Aero, Inc., Santa Cruz, CA (US)

(72) Inventors: Michael Burghardt, Santa Cruz, CA (US); JoeBen Bevirt, Santa Cruz, CA (US); Daniel Burghardt, Santa Cruz, CA (US); Kevin O'Connor, Santa Cruz, CA (US); Tianyu Gu, Santa Cruz, CA (US); Kyle Cordes, Santa Cruz, CA (US); Steve Waller, Santa Cruz, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 0 days.

(21) Appl. No.: 16/721,523

(22) Filed: Dec. 19, 2019

(65) Prior Publication Data

US 2020/0201359 A1   Jun. 25, 2020

Related U.S. Application Data

(60) Provisional application No. 62/782,037, filed on Dec. 19, 2018.

(51) Int. Cl.
| G05D 1/00 | (2006.01) |
| G05D 1/10 | (2006.01) |
| G05D 1/08 | (2006.01) |
| G01C 21/16 | (2006.01) |

(52) U.S. Cl.
CPC ......... *G05D 1/0808* (2013.01); *G01C 21/165* (2013.01)

(58) Field of Classification Search
None
See application file for complete search history.

(56) References Cited

U.S. PATENT DOCUMENTS

| 3,059,876 A | 10/1962 | Platt |
| 3,081,964 A | 3/1963 | Quenzler |
| 3,089,666 A | 5/1963 | Quenzler |
| 3,136,499 A | 6/1964 | Kessler |
| 3,141,633 A | 7/1964 | MacKay |
| 3,404,852 A | 10/1968 | Sambell et al. |
| 3,592,412 A | 7/1971 | Glatfelter |
| 3,795,372 A | 3/1974 | Feldman |
| 4,356,546 A | 10/1982 | Whiteside et al. |
| 4,519,746 A | 5/1985 | Wainauski et al. |

(Continued)

FOREIGN PATENT DOCUMENTS

| CN | 103363993 B | 4/2016 |
| CN | 107042884 A | 8/2017 |

(Continued)

OTHER PUBLICATIONS

International Search Report and Written Opinion for PCT Application No. PCT/US2019/039247 dated Sep. 13, 2019.

(Continued)

*Primary Examiner* — Adam D Tissot
(74) *Attorney, Agent, or Firm* — Jeffrey Schox

(57) ABSTRACT

A system and method that function to generate an updated vehicle state based on a previous vehicle state and a set of sensor measurements. The previous vehicle state can be selected from a set of redundant prior vehicle state candidates. The system and method can optionally detect and correct for sensor measurement faults or failures, prior to updating the vehicle state.

20 Claims, 13 Drawing Sheets

(56) References Cited

U.S. PATENT DOCUMENTS

| | | | |
|---|---|---|---|
| 4,667,909 A | 5/1987 | Curci | |
| 4,914,657 A | 4/1990 | Walter et al. | |
| 4,979,698 A | 12/1990 | Lederman | |
| 5,001,646 A | 3/1991 | Caldwell, et al. | |
| 5,085,315 A | 2/1992 | Sambell | |
| 5,156,363 A | 10/1992 | Cizewski, et al. | |
| 5,184,304 A * | 2/1993 | Huddle | G01C 21/16 |
| | | | 33/321 |
| 5,472,156 A | 12/1995 | Bivens, et al. | |
| 5,515,282 A | 5/1996 | Jackson | |
| 5,806,805 A | 9/1998 | Elbert et al. | |
| 5,868,351 A | 2/1999 | Stamps et al. | |
| 6,460,810 B2 | 10/2002 | James | |
| 6,625,033 B1 | 9/2003 | Steinman | |
| 6,655,631 B2 | 12/2003 | Austen-Brown | |
| 6,719,244 B1 | 4/2004 | Gress | |
| 7,048,505 B2 | 5/2006 | Segota et al. | |
| 7,147,182 B1 | 12/2006 | Flanigan | |
| 7,219,013 B1 | 5/2007 | Young et al. | |
| 7,263,630 B2 | 8/2007 | Sailer | |
| 7,310,573 B2 | 12/2007 | Stickling | |
| 7,318,565 B2 | 1/2008 | Page | |
| 7,376,088 B2 | 5/2008 | Gambardella et al. | |
| 7,822,516 B2 | 10/2010 | Yanaka et al. | |
| 7,874,513 B1 | 1/2011 | Smith | |
| 7,877,627 B1 | 1/2011 | Freydel | |
| 8,275,494 B1 | 9/2012 | Roth | |
| 8,527,233 B2 | 9/2013 | McIntyre | |
| 8,602,347 B2 | 12/2013 | Isaac et al. | |
| 8,708,273 B2 | 4/2014 | Oliver | |
| 8,733,690 B2 | 5/2014 | Bevirt et al. | |
| 8,800,912 B2 | 8/2014 | Oliver | |
| 8,849,479 B2 | 9/2014 | Walter | |
| 8,998,125 B2 | 4/2015 | Hollimon et al. | |
| 9,075,144 B1 | 7/2015 | Straub, et al. | |
| 9,128,109 B1 | 9/2015 | Oneill | |
| 9,435,661 B2 | 9/2016 | Brenner et al. | |
| 9,694,911 B2 | 7/2017 | Bevirt et al. | |
| 10,046,855 B2 | 8/2018 | Bevirt et al. | |
| 10,144,503 B1 | 12/2018 | Vander Lind et al. | |
| 10,144,504 B1 | 12/2018 | Selwa, et al. | |
| 10,183,746 B2 | 1/2019 | McCullough et al. | |
| 2002/0153452 A1 | 10/2002 | King, et al. | |
| 2003/0094537 A1 | 5/2003 | Austen-Brown | |
| 2004/0093130 A1 | 5/2004 | Osder, et al. | |
| 2004/0141170 A1 | 7/2004 | Jamieson, et al. | |
| 2004/0195460 A1 | 10/2004 | Sailer | |
| 2005/0251328 A1 | 11/2005 | Merwe et al. | |
| 2007/0170307 A1 * | 7/2007 | de la Cierva Hoces | |
| | | | B64C 27/24 |
| | | | 244/7 R |
| 2008/0205416 A1 | 8/2008 | Dechiara | |
| 2010/0052978 A1 | 3/2010 | Tillotson | |
| 2010/0100260 A1 | 4/2010 | McIntyre et al. | |
| 2010/0264257 A1 | 10/2010 | Brunken | |
| 2011/0001020 A1 | 1/2011 | Forgac | |
| 2011/0180656 A1 | 7/2011 | Shue, et al. | |
| 2011/0303795 A1 | 12/2011 | Oliver | |
| 2011/0315809 A1 * | 12/2011 | Oliver | B64D 27/06 |
| | | | 244/12.4 |
| 2012/0025016 A1 | 2/2012 | Methven et al. | |
| 2012/0061526 A1 | 3/2012 | Brunken | |
| 2013/0060406 A1 | 3/2013 | Christensen, et al. | |
| 2013/0132548 A1 | 5/2013 | Cabos | |
| 2013/0138413 A1 | 5/2013 | Finch et al. | |
| 2013/0201316 A1 | 8/2013 | Binder et al. | |
| 2013/0204544 A1 | 8/2013 | Thomas | |
| 2014/0138492 A1 | 5/2014 | Van Staagen | |
| 2014/0299708 A1 | 10/2014 | Green et al. | |
| 2014/0339372 A1 | 11/2014 | Dekel, et al. | |
| 2015/0012154 A1 | 1/2015 | Senkel et al. | |
| 2015/0056058 A1 | 2/2015 | Grissom et al. | |
| 2015/0102659 A1 | 4/2015 | Liffring et al. | |
| 2015/0136897 A1 | 5/2015 | Seibel et al. | |
| 2015/0232178 A1 | 8/2015 | Reiter | |
| 2015/0266571 A1 | 9/2015 | Bevirt et al. | |
| 2015/0274292 A1 | 10/2015 | Delorean | |
| 2016/0026190 A1 | 1/2016 | Kowalski, et al. | |
| 2016/0031555 A1 | 2/2016 | Bevirt et al. | |
| 2016/0031556 A1 | 2/2016 | Bevirt et al. | |
| 2016/0083073 A1 | 3/2016 | Beckman | |
| 2016/0112151 A1 | 4/2016 | Chedas et al. | |
| 2016/0209290 A1 | 7/2016 | Shue | |
| 2016/0294882 A1 | 10/2016 | Michaels | |
| 2016/0304194 A1 | 10/2016 | Bevirt et al. | |
| 2017/0036753 A1 | 2/2017 | Shue | |
| 2017/0101176 A1 | 4/2017 | Alber et al. | |
| 2017/0104385 A1 | 4/2017 | Salamon et al. | |
| 2017/0131716 A1 | 5/2017 | Brekke et al. | |
| 2017/0217584 A1 | 8/2017 | Elfeky, et al. | |
| 2017/0274983 A1 | 9/2017 | Beckman et al. | |
| 2017/0277152 A1 | 9/2017 | Liu et al. | |
| 2018/0001994 A1 | 1/2018 | Morrison | |
| 2018/0105279 A1 | 4/2018 | Tighe et al. | |
| 2018/0183657 A1 * | 6/2018 | Beilin | H04L 43/10 |
| 2018/0237148 A1 * | 8/2018 | Hehn | B64C 39/024 |
| 2018/0239366 A1 * | 8/2018 | Cutler | B64C 13/503 |
| 2018/0244370 A1 | 8/2018 | Lombard | |
| 2018/0251226 A1 | 9/2018 | Fenny et al. | |
| 2018/0290736 A1 | 10/2018 | Mikic et al. | |
| 2018/0354615 A1 | 12/2018 | Groninga et al. | |
| 2019/0144109 A1 | 5/2019 | Ewing, et al. | |
| 2019/0315471 A1 | 10/2019 | Moore, et al. | |
| 2020/0142431 A1 | 5/2020 | Mehl, et al. | |

FOREIGN PATENT DOCUMENTS

| | | |
|---|---|---|
| EP | 0945841 A1 | 9/1999 |
| EP | 3366583 A1 | 8/2018 |

OTHER PUBLICATIONS

International Search Report and Written Opinion for PCT Application No. PCT/US2019035236 dated Aug. 20, 2019.
"Airfolds Blade Profile", Mecaflux Heliciel, Propeller & Wing, https://www.heliciel.com/en/aerodynamique-hydrodynamique/profils%20aile%20profil%20pale.htm.
"Inclined Flat Plate", Aerodynamics of the airplane, Feb. 13, 2016.
"International Search Report and Written Opinion of the ISA dated Dec. 4, 2019 for PCT/US19/51565."
"International Search Report and Written Opinion of the ISA, dated Jul. 24, 2019, for application No. PCT/US19/31863."
Denham, Jr., James W., et al., "Converging on a Precision Hover Control Strategy for the F35B Stovl Aircraft", AIAA Guidance, Navigation and Control Conference and Exhibit Aug. 18-21, 2006, Honolulu, Hawaii, Abstract only.
Falco, Gianluca , et al., "Loose and Tight GNSS/INS Integrations: Comparison of Performance Assessed in Real Urban Scenarios", Sensors (Basel) Feb. 2017; 17 (2): 225, https://www.ncbi.nlm.nih.gov/pmc/articles/PMC5335985/.
Gold, Phillip J., et al., "Design and Pilot Evaluation of the RAH-66 Comanche Selectable Control Modes", https://ntrs.nasa.gov/search.jsp?, N94-13322, pp. 419-431, Jul. 1, 1993.
Saraf, A. Amit Kumar , et al., "Study of Flow Separation on Airfoil with Bump", International Journal of Applied Engineering Research ISSN 09773-4562, vol. 13, No. 16 (2018), pp. 128686-12872.
Yeh, Y.C. (Bob) , "Triple-Triple Redundant 777 Primary Flight Computer", 1996, IEEE, pp. 293-307 (Year: 1996).
International Search Report and Written Opinion of the ISA dated Mar. 19, 2020 for PCT/US19/67618.
"Ailerons", Nasa student page, 3 pages, Nov. 1, 2018, downloaded from: https://www.grc.nasa.gov/ww/k-12/airplane/alr.hltrn.
Berger, Tom , "Handling Qualities Requirements and Control Design for High-Speed Rotorcraft", Special Report FCDD-AMV-20-01, Feb. 2020, Combat Capabilities Devcom Aviation and Missile Center, U.S. Army, 360 pages.
Kang, Youngshin, et al., "Development of flight control system and troubleshooting on flight test of a tilt-rotor unmanned aerial vehicle", International Journal of Aeronautical and Space Sciences (IJASS), vol. 17 No. 1, 2016, pp. 120-131.

(56) References Cited

OTHER PUBLICATIONS

Radhakrishnan, Anand, et al., "An Experimental Investigation of a Quad Tilt Rotor in Ground Effect", 21st Applied Aerodynamics Conference, Jun. 23-26, 2003, Orlando, Florida, AIAA 2003-3517, 11 pages.

Thorsen, Adam T., "Development of Evaluation of a Unified Control Architecture for a Compound Rotorcraft in Maneuvering Flight", AIAA Aviation Forum, AIAA Atmospheric Flight Mechanics Conference, Jun. 13-17, 2016, Nashington, D.C., AIAA Paper 10.2514/6.2016-3392, 19 pages.

Vigano, Luca, et al., "Development of Augmented Control Laws for a Tiltrotor in Low and High Speed Flight Modes", 43rd European Rotorcraft Forum Proceedings, Sep. 12-15, 2017, Milan, Italy, vol. 1, pp. 438 to 451.

Walker, Gregory, et al., "F-35B integrated flight-propulsion control development", AIAA Aviation Forum, 2013 International Powered Lift Conference, Aug. 12-14, 2013, Los Angeles, Ca, AIA Paper 10.2514/6.2013-4243, 16 pages.

Whittle, Richard, "Flying the Osprey is not dangerous, just different: Veteran pilots", Breaking Defense, 5 Sep. 2012, 9 pages, downloaded from: https://breakingdefense.com/2012/09/flying-the-osprey-is-not-dangerous ust-different-veteran-pilo/.

International Search Report for Application No. PCT/US2019/065301, dated Aug. 31, 2020.

* cited by examiner

VEHICLE NAVIGATION SYSTEM

CROSS-REFERENCE TO RELATED APPLICATIONS

This application claims the benefit of U.S. Provisional Application No. 62/782,037 filed 19 Dec. 2018, which is incorporated in its entirety by this reference.

This application is related to U.S. application Ser. No. 16/409,653 filed 10 May 2019, U.S. application Ser. No. 16/573,837 filed 17 Sep. 2019, and U.S. application Ser. No. 16/708,367 filed 9 Dec. 2019, each of which is incorporated in its entirety by this reference.

TECHNICAL FIELD

This invention relates generally to the vehicular management field, and more specifically to a new and useful vehicle navigation system in the vehicular management field.

BACKGROUND

To aid in navigation, modern aircraft utilize various forms of inertial navigation systems (INSs). An INS typically includes a computer, various motion sensors, rotation sensors, and other sensors (e.g., magnetic sensors) to continuously determine the state (e.g., position, attitude, and velocity) of the aircraft via dead-reckoning (e.g., without using external references). However, conventional INSs are typically open systems (e.g., receiving neither feed-forward nor feed-back state variables) and thus prone to error accumulation (e.g., due to drift in the dead-reckoning calculation). In addition, sensor measurements provided to the INS in conventional architectures often include air data sources that can be unreliable in some contexts (e.g., a static-pitot system that can fail due to icing, poor maintenance, etc.), which can lead to increased uncertainty in the aircraft state and, in some cases, negatively impact aircraft control functions.

Thus, there is a need in the aviation field to create a new and useful vehicle navigation system. This invention provides such a new and useful system.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. Overview.

Figure 1A:
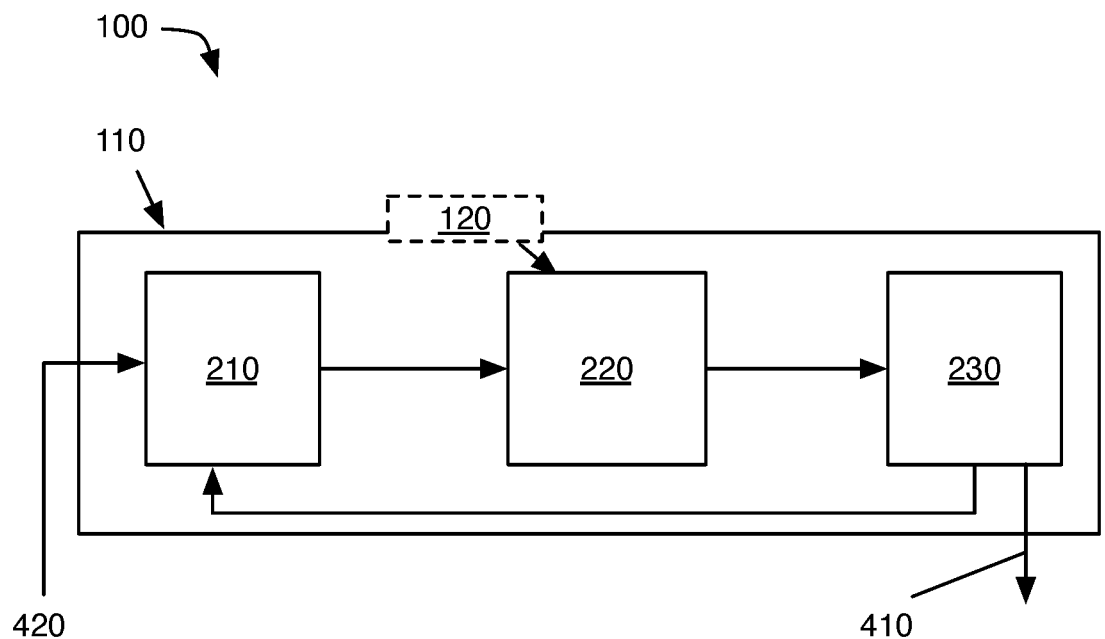
FIG. 1A is a schematic diagram of a first variation of the vehicle navigation system.
Figure 1B:
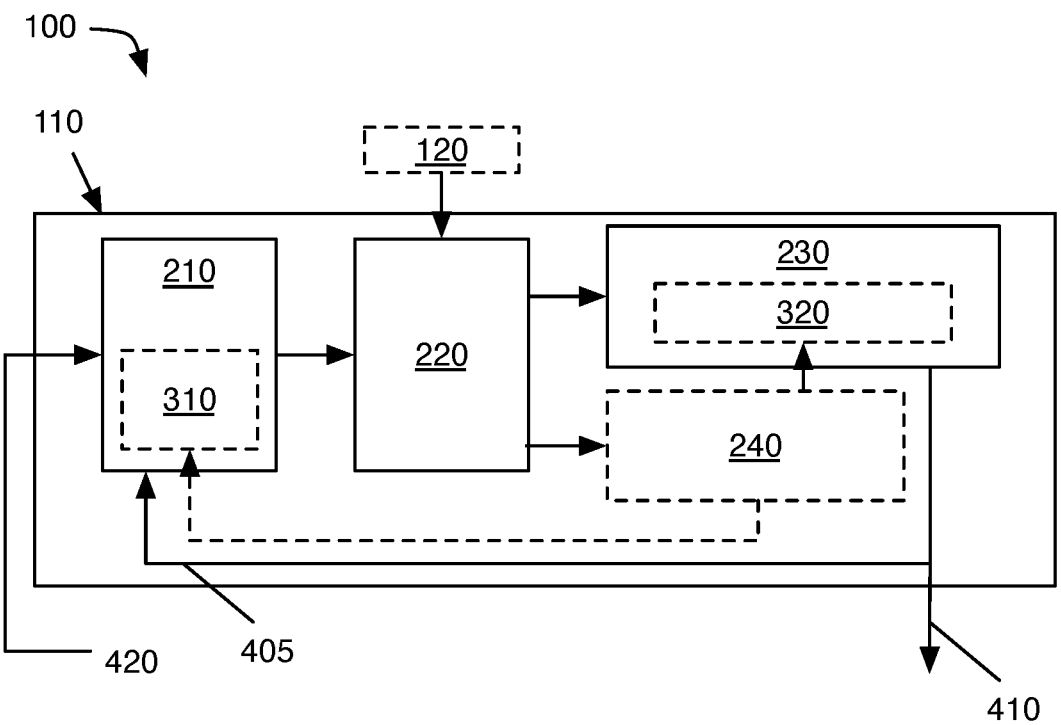
FIG. 1B is a schematic diagram of a second variation of the vehicle navigation system.
Figure 1C:
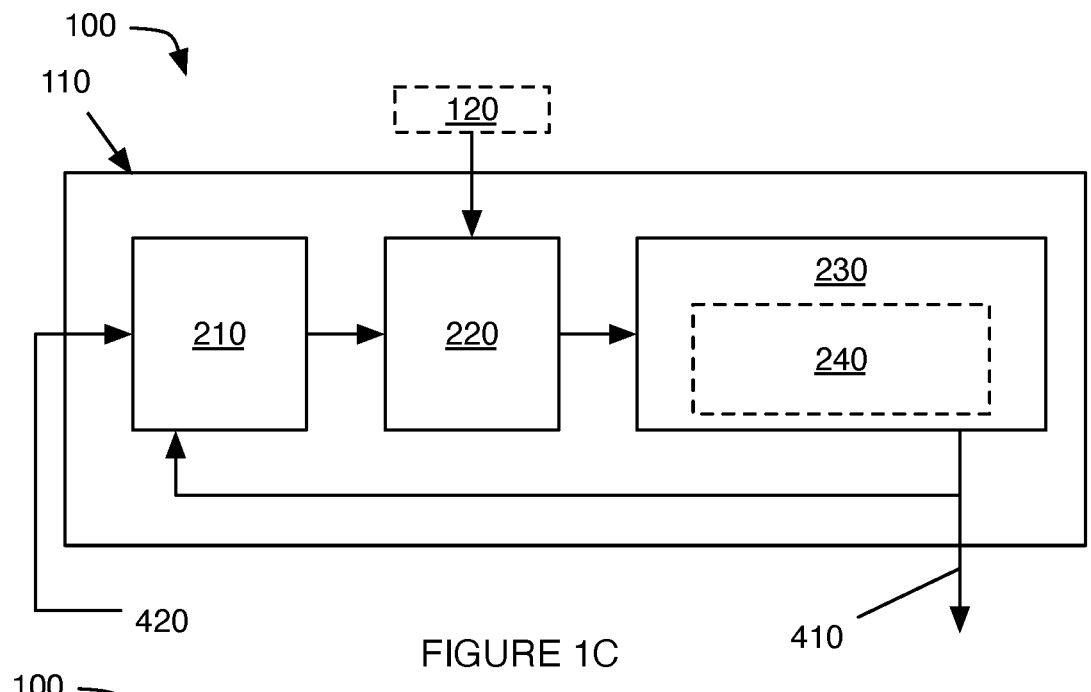
FIG. 1C is a schematic diagram of a third variation of the vehicle navigation system.
Figure 2:
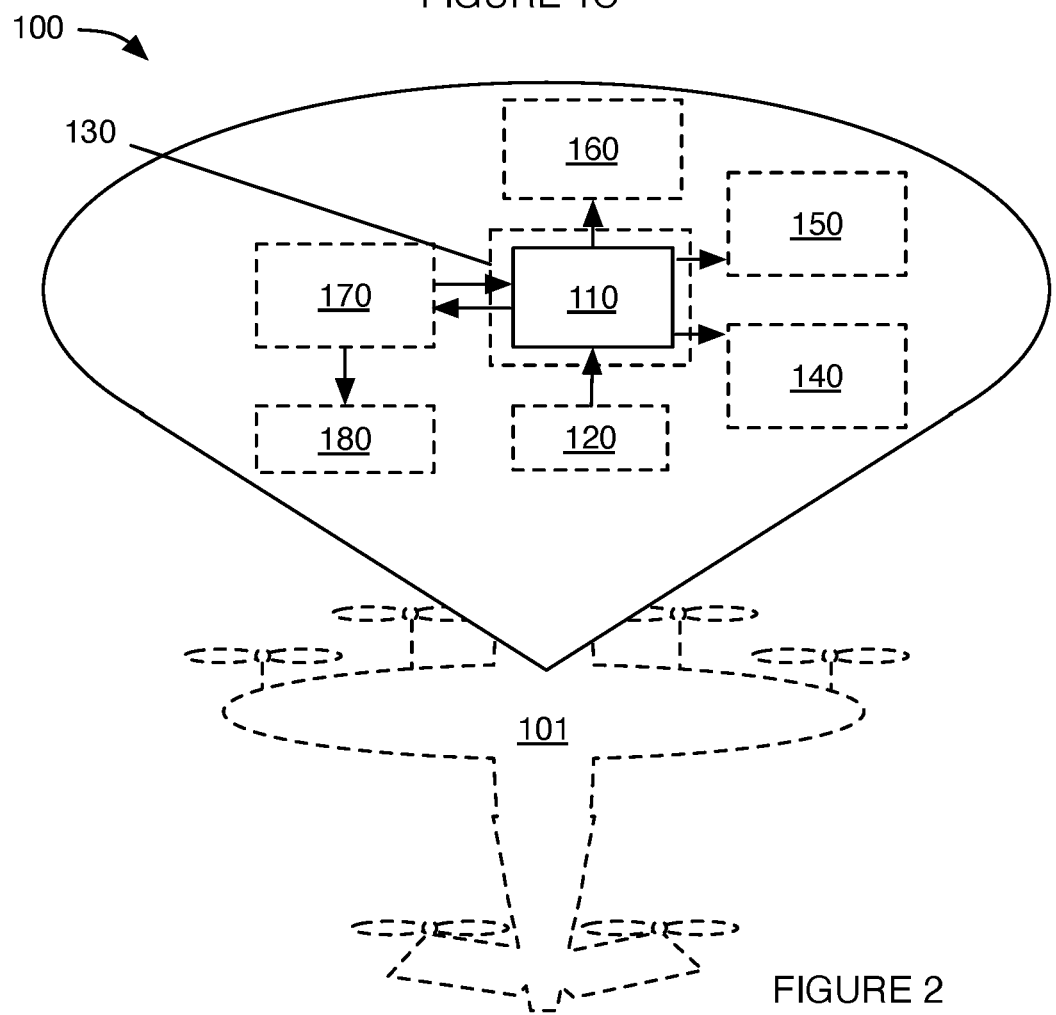
FIG. 2 is a schematic diagram of a vehicle control architecture that includes a variation of the vehicle navigation system.

The system 100 functions to generate an updated vehicle state based on a previous vehicle state 405 and a set of sensor measurements 440, and can optionally function to control the vehicle 101 based on the vehicle state 410. As shown in FIG. 2, the system 100 includes a vehicle navigation system (VNS) 110, a set of sensors 120, and can optionally include one or more: housings 130, guidance systems 140, displays 150, control input mechanisms 160, vehicle controllers 170, effectors 180, and/or other suitable components. The system 100 additionally includes a set of software modules, which can include: a voting module 250, a prediction module 210, a fault detection module 220, an update module 230, and/or any other appropriate software modules. The set of software modules can optionally include a bias estimation module 240 and/or any other appropriate modules. The system 100 can also function to implement a motion model 310, an observation model 320, and/or any other appropriate models.

Figures 3A, 3B:
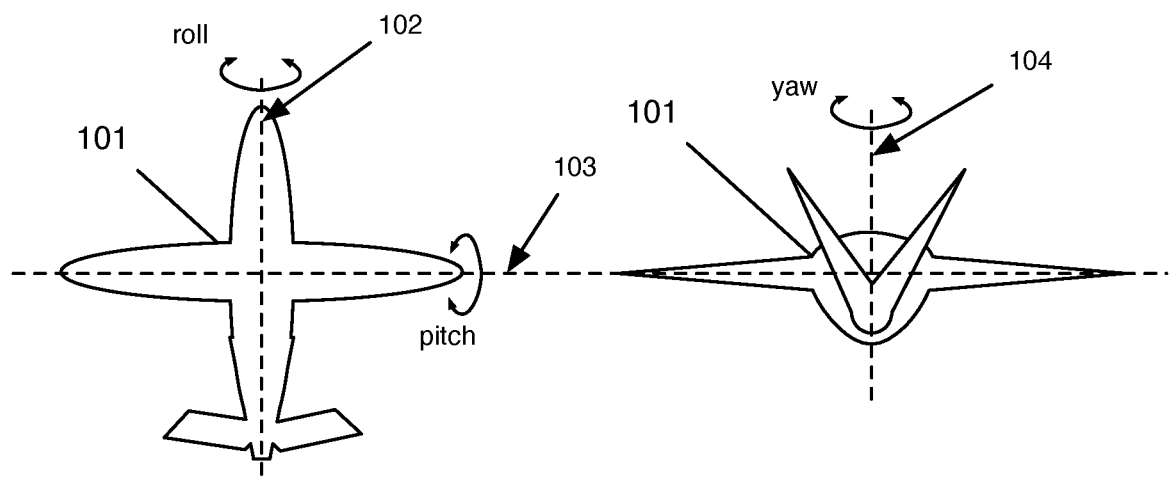
FIG. 3A and FIG. 3B are a top view and a rear view, respectively, of an example of a vehicle with labelled axes.

The system 100 can operate on any suitable vehicle. The vehicle 101 is preferably an aircraft such as: a fixed-wing aircraft, rotorcraft, tilt-rotor aircraft, tilt-prop aircraft, tilt-wing aircraft, helicopter, or jetcraft, but can additionally or alternately be a spacecraft (e.g., rocket, satellite), watercraft (e.g., boat, submarine, hovercraft), land vehicle (e.g., train, car, bus, tank, truck, etc.), and/or any other suitable vehicle. Hereinafter all references to "aircraft" can be equally applicable to vehicles. In variants, the vehicle a tilt-rotor aircraft, such as the aircraft described in U.S. application Ser. No. 16/409,653 filed 10 May 2019, which is incorporated in its entirety by this reference. The vehicle can define any suitable set of reference points, axes, and/or planes (examples shown in FIG. 3A and FIG. 3B). In variants, the vehicle 101 can define: a lateral axis 102 (e.g., pitch axis), longitudinal axis 103 (e.g., roll axis), vertical axis 104 (e.g., yaw axis), a center point (e.g., unloaded center of gravity, loaded center of gravity, geometric center, intersection point of axes, etc.), and/or any other suitable reference. In variants, the vehicle can define the following reference frames: (local) North-East-Down (NED) frame defined at a prescribed geodetic position (the current state estimate), cartesian (x, y, z) coordinates relative to frame origin at point, earth-centered/earth-fixed frame Cartesian coordinates relative to frame origin at earth's center, geodetic frame—elliptical coordinates (latitude, longitude, altitude) relative to frame origin at Earth's center, vehicle body-fixed frame relative to frame origin (e.g., defined as the center of mass), sensor-fixed frame—cartesian coordinates relative to frame origin at sensor's measurement origin, and/or any other suitable reference frame.

The term "rotor" as utilized herein, in relation to the VNS, an aircraft including the VNS, or otherwise, can refer to a rotor, a propeller, and/or any other suitable rotary aerodynamic actuator. While a rotor can refer to a rotary aerodynamic actuator that makes use of an articulated or semi-rigid hub (e.g., wherein the connection of the blades to the hub can be articulated, flexible, rigid, and/or otherwise connected), and a propeller can refer to a rotary aerodynamic actuator that makes use of a rigid hub (e.g., wherein the connection of the blades to the hub can be articulated, flexible, rigid, and/or otherwise connected), no such distinction is explicit or implied when used herein, and the usage of "rotor" can refer to either configuration, and any other suitable configuration of articulated or rigid blades, and/or any other suitable configuration of blade connections to a central member or hub. Likewise, the usage of "propeller" can refer to either configuration, and any other suitable configuration of articulated or rigid blades, and/or any other suitable configuration of blade connections to a central member or hub. Accordingly, the tiltrotor aircraft can be referred to as a tilt-propeller aircraft, a tilt-prop aircraft, a tilt-wing aircraft, and/or otherwise suitably referred to or described.

2. Benefits.

Variations of the technology can afford several benefits and/or advantages.

First, variations of the technology can improve control performance of a vehicle. Such variations can determine more information (e.g., estimate more state parameters) while maintaining or improving the efficiency and/or speed of vehicle state determination by utilizing efficient computational methods, which can further enable the use of lower cost, smaller, and/or lighter processing components to achieve similar computation times-allowing cost and/or weight reduction of the vehicle without a sacrifice to vehicle control performance. In one example, the computational complexity can be decreased (e.g., even when estimating angular velocity and/or linear acceleration in a single Kalman filter) by sampling and using sigma points from one side of the Gaussian distribution (e.g., only the positive or negative side). This example can assume that the perturbations about the operating point (of the Gaussian distribution) are relatively small, and that the sigma points are approximately symmetric about the operating point. In a second example, the technology can estimate inertial biases while maintaining computational efficiency. In this example, the technology can couple the inertial biases with the main vehicle state within the observation model, measurement fault detection, and correction processes, but decouple the inertial biases from the main vehicle state when updating the covariances.

Second, variations of the technology can improve vehicle safety by affording increased resilience to sensor and/or processing failures. This can be achieved by sensing and/or computational redundancy in the: number of sensors/processors, type of sensors/processors, make/manufacturer of sensors/processors, relative pose of the sensors/processor on the vehicle (orientation and/or location), communication pathways between the sensors/processors, and/or other redundancies of the sensors/processors, thereby reducing, mitigating, and/or eliminating vehicle reliance on determinism in a single source of data and/or processor. Redundant sensors/processors can experience different failure modes, thereby mitigating the impact of a single failure mode on vehicle operation. In a specific example, the system can include three or more vehicle navigation systems distributed such that a physical impact to a portion of the vehicle will not take down all three simultaneously. Such redundancies in the sensors/processors allow each instance to be cheaper, lighter, and/or smaller without imposing an additional safety risk or compromising the vehicle performance. The system further employs a voting scheme to determine the appropriate input from multiple data sources (e.g., select the appropriate vehicle state from the set of vehicle navigation systems). In variants, this redundancy can enable the system to be robust to different localized operational contexts (e.g., vibrations) experienced throughout the vehicle.

Third, variants of the technology can be robust to sensor failure by detecting measurement faults and correcting or removing the faulty measurements before the vehicle state is updated. In examples, the technology can detect measurement faults within a single filter (e.g., Kalman filter), which can enable innovation tests to check for measurement faults. Additionally or alternatively, the technology can be robust to sensor failure by dynamically adjusting the measurement noise covariance (e.g., measurement weights in the observation model; used to calculate the innovation covariance that is used to calculate the Kalman gain; etc.) based on degree of correlation.

Fourth, variants of the technology can generate more accurate vehicle state estimates by leveraging a tightly coupling full state estimation within a single filter. For example, the method can estimate: linear acceleration, angular velocity (and/or angular acceleration), air data, and/or other vehicle state parameters using a tightly coupled motion model.

However, the technology can additionally or alternatively provide any other suitable benefits and/or advantages.

3. System.

Figure 15:
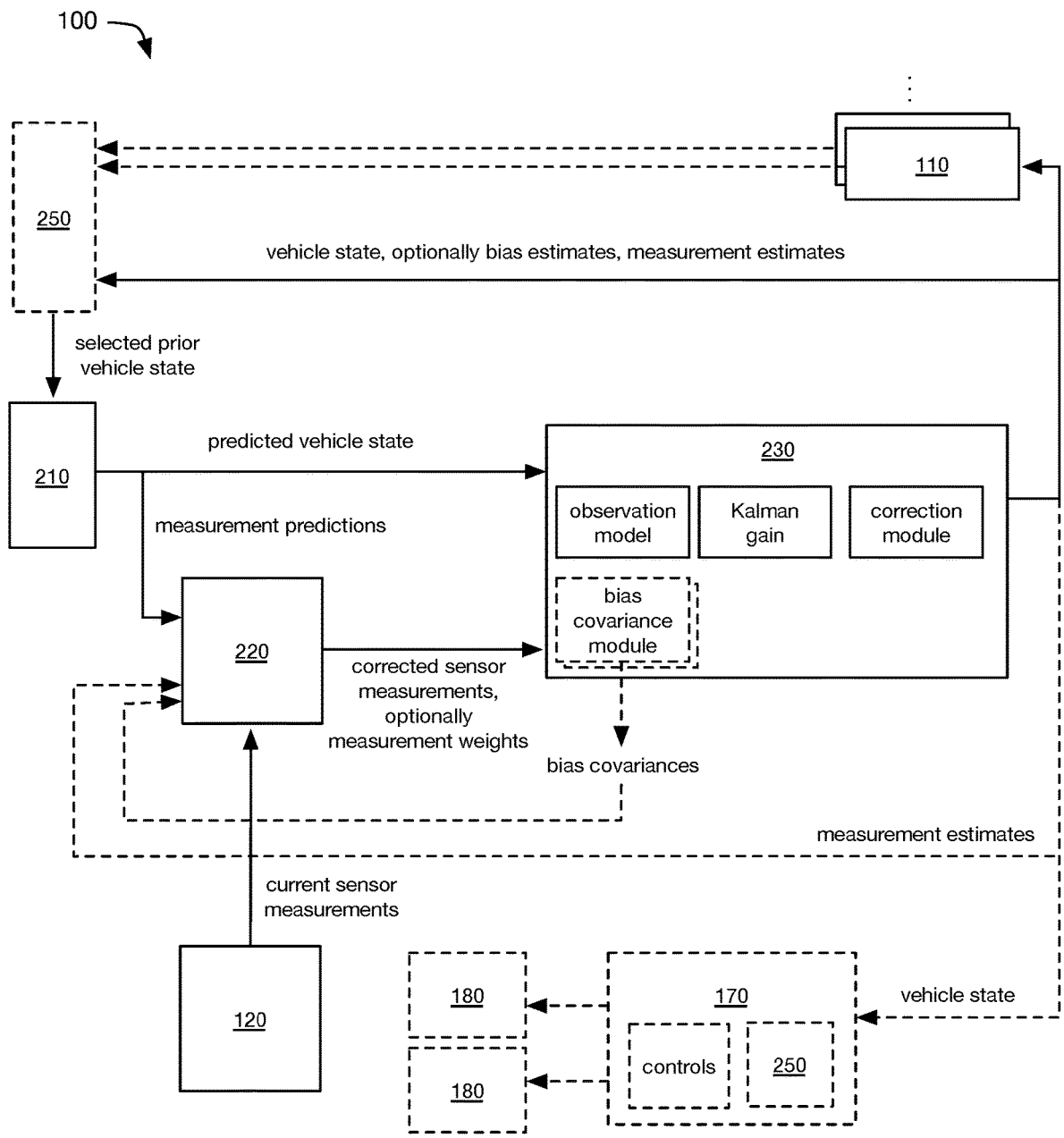
FIG. 15 is a schematic diagram of an aircraft control architecture that includes a variation of the vehicle navigation system.

The system 100 functions to generate an updated vehicle state 410 based on a previous vehicle state 405 and a set of sensor measurements 440 (e.g., contextual vehicle measurements), and can optionally function to control the vehicle 101 based on the updated vehicle state 410. The system 100 includes a vehicle navigation system (VNS) 110, and a set of sensors 120, and can optionally include one or more: housings 130, power systems, guidance systems 140, displays 150, control input mechanisms 160, flight controllers 170, effectors 180, and/or other suitable components. The system 100 additionally includes a set of software modules, which can include: a voting module 250, a prediction module 210, a fault detection module 220, an update module 230, and/or any other appropriate software modules. The set of software modules can optionally include a bias estimation module 240 and/or any other appropriate modules. The system 100 can also function to implement a motion model 310, an observation model 320, and/or any other appropriate models. An example of the system 100 is shown in FIG. 15.

Figure 10:
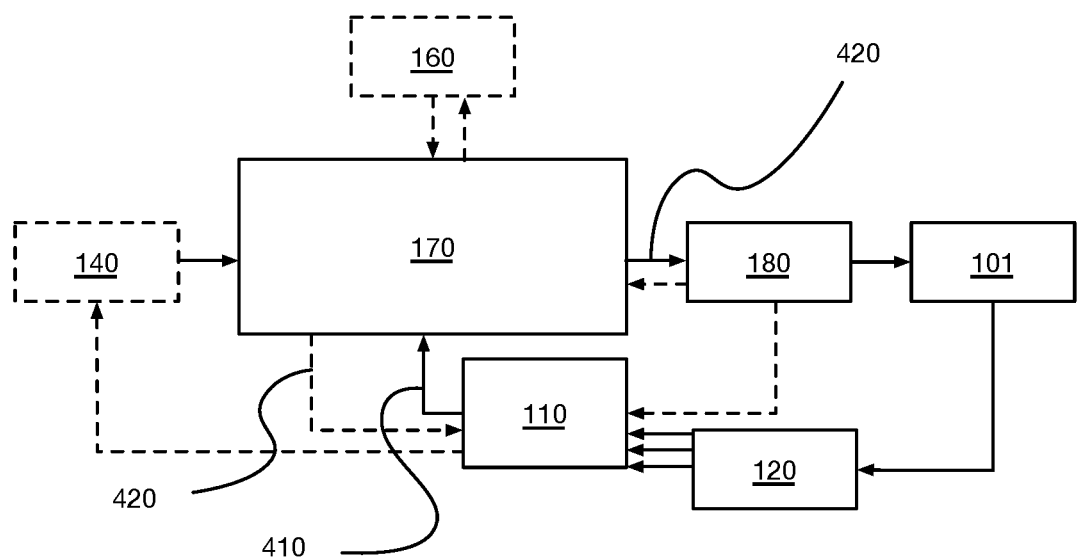
FIG. 10 is a schematic diagram of an aircraft command and control architecture that includes a variation of the vehicle navigation system.

The VNS 110 functions to fuse data and sensor inputs from other systems of the vehicle to produce a real-time, continuous estimation of the vehicle state. The output generated by the VNS is vehicle state estimate, which preferably includes information about the current geodetic position of the vehicle, but can be defined in the context of any suitable coordinate frame. In a first variant, the vehicle state (or subcomponents thereof) is represented in SO (3) (e.g., the 3D rotation group, group of all rotations about the origin of a 3D Euclidean space R3, etc.; represented as a direction cosine matrix, etc.), but can be represented in Euler angles (e.g., Tait-Bryan angles, intrinsic rotations, extrinsic rotations, roll/pitch/yaw, etc.), unit Quaternion, Cartesian coordinates, spherical coordinates, and/or any using other suitable representation. The vehicle state can include: an attitude, linear displacement (e.g., latitude, longitude, altitude/elevation, etc.), linear velocity, linear acceleration, high order linear derivatives (jerk, snap, etc.), angular displacement (e.g., pitch, roll, and yaw), angular velocity, angular acceleration, high order angular derivatives (jerk, snap, etc.), and/or any other suitable information. In a second variant, the vehicle state can include the forces and/or moments on the vehicle (e.g., the accelerations resulting from such forces and moments). Alternatively, the forces and/or moments can be used as inputs (e.g., to determine the state variables). In a third variant, the vehicle state can include biases associated with various sensors, measurements, and/or parameters, which can drift over time and thus can benefit from being estimated along with other vehicle state variables. For example, the state vector can include accelerometer biases, gyroscope biases, and magnetometer biases (e.g., associated with each accelerometer, gyroscope, and/or magnetometer on the vehicle). Estimating the bias of certain sensors that are prone to bias drift or external interference (e.g., such as magnetometers, which can experience spikes in magnetic field inputs resulting from local variations that depart from the Earth's magnetic field) can result in more accurate sensor measurements (and, thus more accurate state estimation that relies upon predicting observations by the sensors, such as the VNS). In a fourth variant, the vehicle state can include a direction cosine matrix communicated as a unit quaternion. In a fifth variant, the vehicle state can be a vector or matrix of vehicle parameters (e.g., vehicle pose, vehicle kinematics, etc.) ambient environment parameters (e.g., temperature, wind heading, etc.), effector states (e.g., position, power output, power input, etc.) and/or any other suitable parameter. In a sixth variant, the vehicle state can include a class or label. The class or label can identify a flight regime of an aircraft, such as hover, transition, forward flight, ground taxi, which can be used to interpret input commands from the input mechanism as described in U.S. application Ser. No. 16/708,367 filed 9 Dec. 2019, which is incorporated in its entirety by this reference; identify vehicle or component health (e.g., "healthy," "caution," "failed"); and/or otherwise represent the vehicle state. An example of the command and control architecture is shown in FIG. 10.

In a specific example, the state of the aircraft (e.g., estimated and output by the VNS as a vehicle state vector) includes the geodetic position of the aircraft, the attitude (e.g., pitch, roll, and yaw) of the aircraft, the linear velocity vector of the aircraft, the angular velocity vector of the aircraft, the linear acceleration vector of the aircraft, the angular acceleration vector of the aircraft, the relative wind velocity of the aircraft, and the above ground level (AGL) altitude of the aircraft. Thus, the estimated state of the aircraft at a given time step is based at least upon the estimated values of the variables listed above (e.g., the estimated state of the aircraft at the previous time step).

However, the state of the vehicle as estimated by the VNS can additionally or alternatively include any other suitable state variables.

Figure 9:
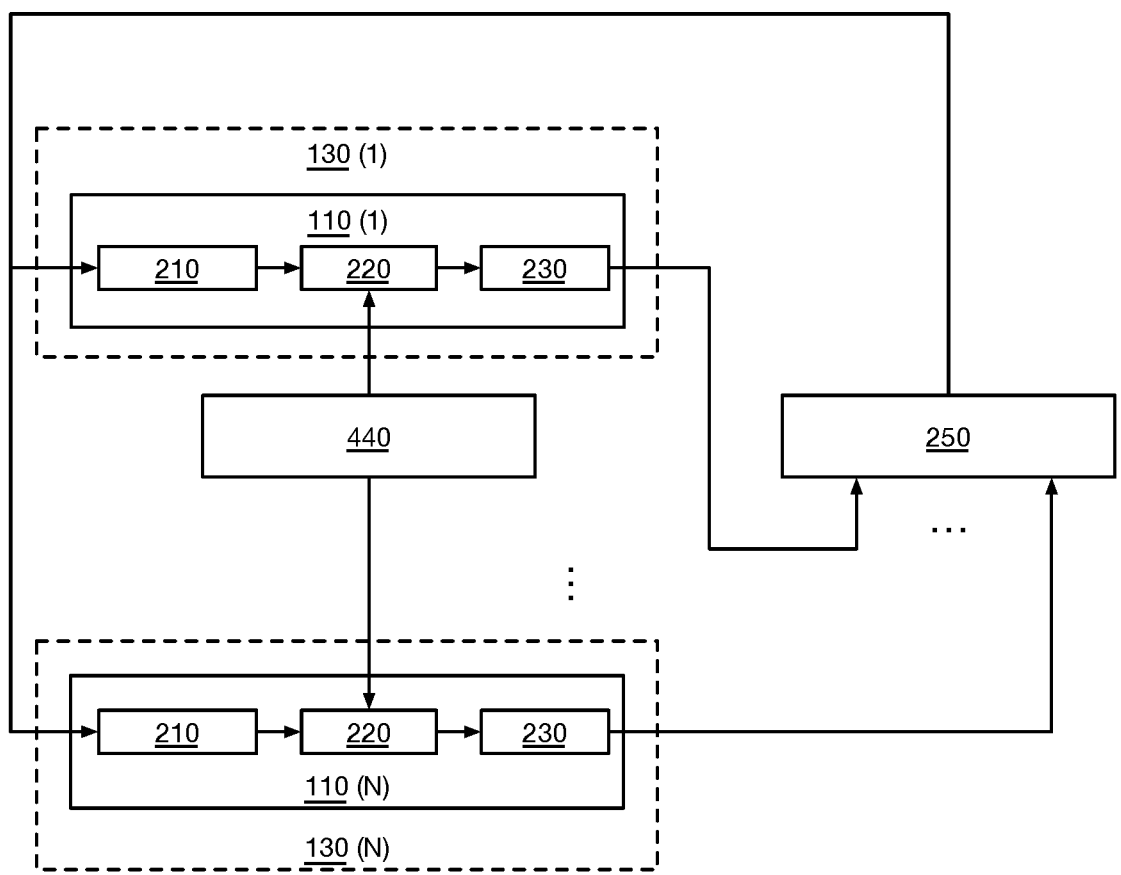
FIG. 9 in a schematic diagram of a voting architecture which includes a variation of the vehicle navigation system.

The system 100 can include one or more VNSs. The system 100 can include three or more VNSs, four or more, two, three, four, five, six, eight, more than eight, and/or any appropriate number of vehicle navigation systems. Preferably, a plurality of VNSs are employed in conjunction with at least one voting module (an example is shown in FIG. 9).

Figure 14A:
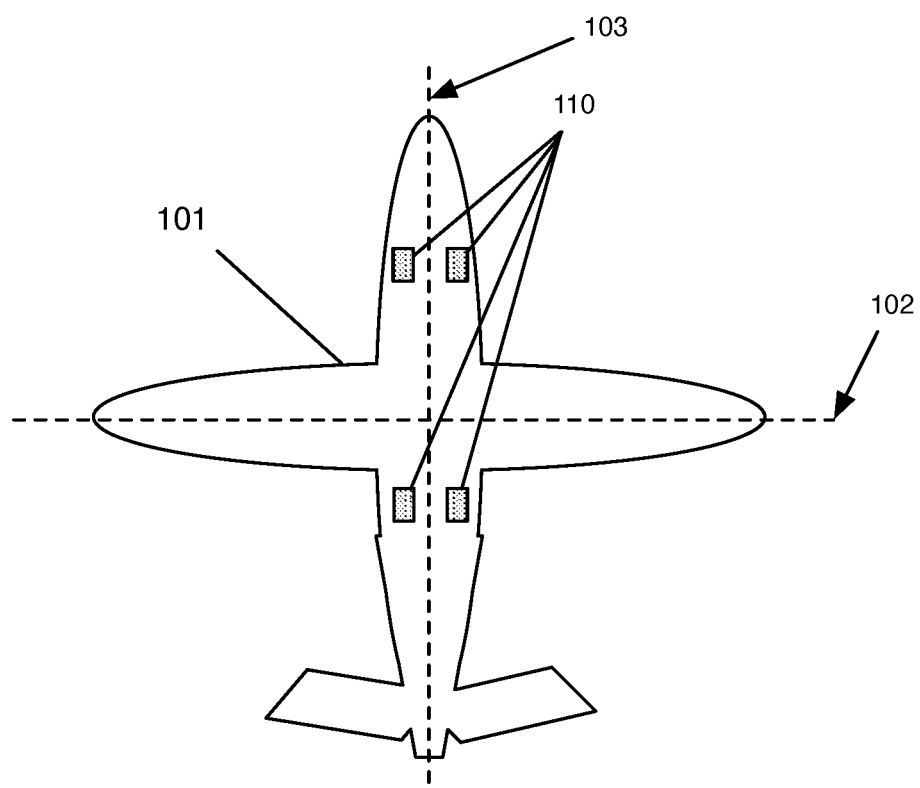
FIG. 14A, FIG. 14B, and FIG. 14C are variants of arrangements of vehicle navigation systems relative to vehicle axes from top view, top view, and a rear view, respectively.
Figure 14B:
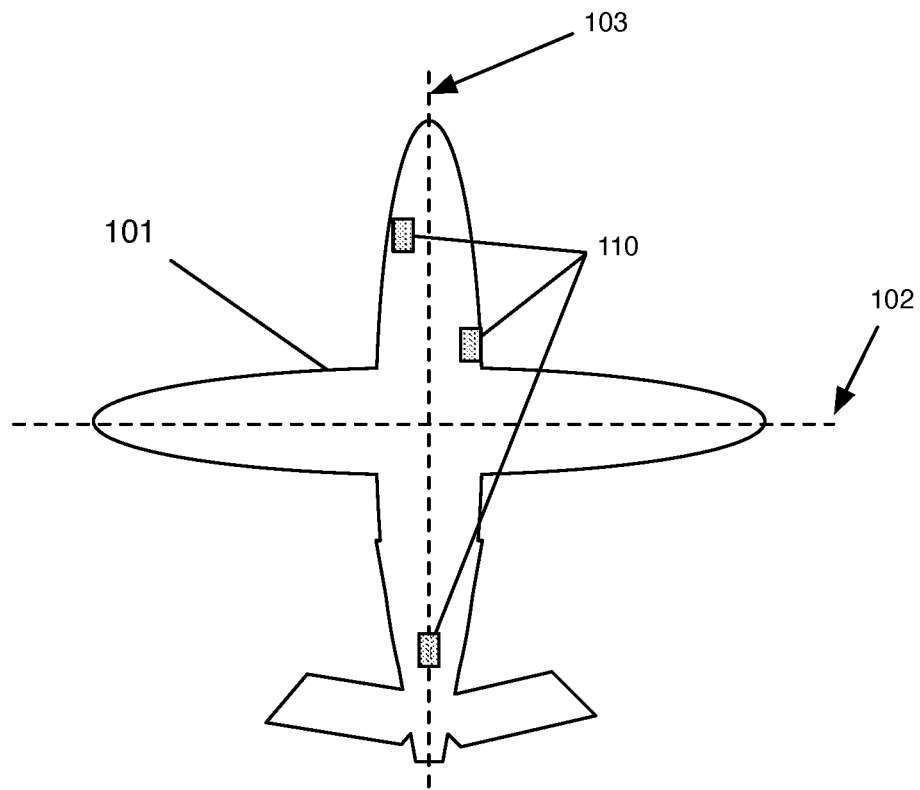
Figure 14C:
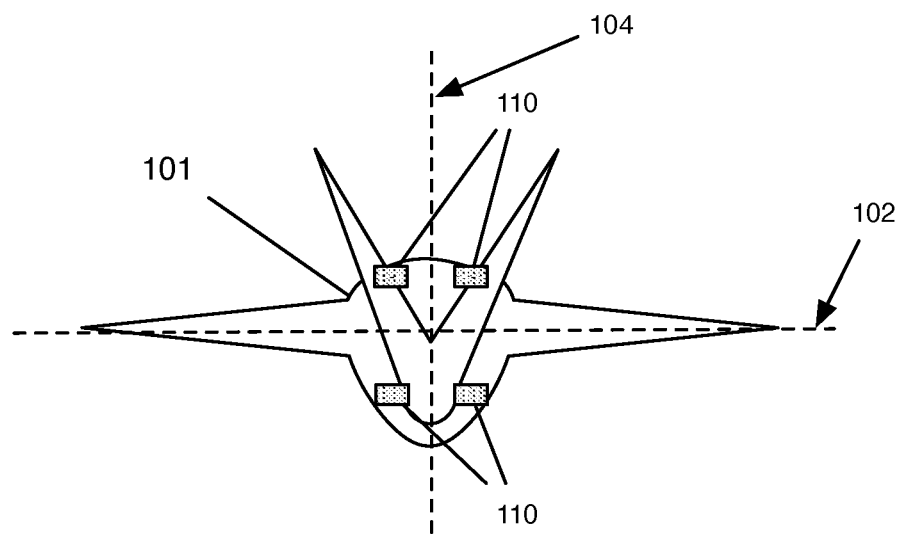

The VNS system(s) can have any suitable distribution, pose, and/or arrangement on the vehicle (examples are shown in FIGS. 14A, 14B, and 14C). The VNS(s) can be aligned relative to one or more axes of the vehicle (e.g., lateral, longitudinal, vertical) and/or sensor measurement axes (e.g., IMU axes). The VNS(s) can be coaxial, parallel, perpendicular, skew, and/or otherwise oriented relative to an axis. The VNS(s) can be distributed symmetrically or asymmetrically relative to the vehicle center point and/or one or more vehicle axes, such as: a single VNS located at center point, eight VNS systems forming a body centered cubic structure around the center point, a left VNS and a right VNS symmetric about the yaw-roll plane, a top VNS and a bottom VNS asymmetric about pitch-roll plane, and/or any other appropriate arrangement. In a first variant, the system includes four VNSs, where the first, second, and third VNS collectively define a plane, wherein the fourth VNS is arranged outside of the plane. In a second variant, the VNS can be located within the housing, such as: mounted to the housing, enclosed within the housing, located relative to the housing, oriented relative to the housing, and/or otherwise arranged relative to the housing. In a third variant, the VNS can be integrated into the vehicle, such as integrated into the vehicle dash, integrated into an onboard computing system, and/or otherwise integrated into the vehicle. In a fourth variant, the VNS can be located externally from the vehicle (e.g., on a cloud server, on a remote server) and communicatively coupled to the vehicle via a wireless communication link. In the third variant, the system can include one or more VNS components onboard the vehicle. In this variant, part of the VNS processing can be performed onboard the vehicle, or can be entirely remote. In a specific example of the third variant, the vehicle is remotely piloted or controlled, wherein one or more components of the VNS are located proximal to the remote input mechanism. In a second specific example, one or more VNS(s) can be mounted to a stiff part of the aircraft (e.g., airframe structural element). In a third specific example, one or more VNS(s) are located distal to and/or distributed relative to high voltage electrical components and/or high electric-field generating components (e.g., high voltage cables; components generating more than a threshold electric field strength; etc.) on the aircraft. The VNSs can be spaced apart from (e.g., by <10 cm, 10 cm, 20 cm, 50 cm, 1 m, 2 m, 3 m, >3 m, and/or any subset of spacings therein) and/or electrically isolated (e.g., via Faraday cage style enclosure for a conductive housing) one or more high voltage electrical components such as batteries, electrical propulsion units, high voltage cables, and/or any other suitable components.

The VNS can have any appropriate connections to other endpoints on the vehicle such as: other VNSs (all other VNSs or a subset therein), sensors (indirectly connected through another VNS and/or directly connected), power systems, guidance systems, displays, control input mechanisms, flight controllers, effectors, and/or other suitable components. The connections to the various endpoints can be wired and/or wireless. The connections can have any suitable architecture and/or redundancy, and can be arranged in a ring, branching network, and/or have any other suitable arrangement. There number of VNS connections associated with a set of endpoints can be: (for VNS connections: endpoints) 1:1, 1:N, N:1, and/or otherwise suitably implemented. The connections can be data connections, power connections, and/or a combined power-data connection (e.g., PoE). In a specific example, the connections are the redundant connections described in U.S. application Ser. No. 16/573,837 filed 17 Sep. 2019, which is incorporated in its entirety by this reference. In a different specific example, the VNS is connected to the control input mechanism using the same control scheme described in U.S. application Ser. No. 16/708,367 filed 9 Dec. 2019, which is incorporated in its entirety by this reference.

The VNS can include any suitable set of processing modules executing any suitable set of method steps. The VNS can include: a voting module, a prediction module, a fault detection module, and/or an update module (examples shown in FIG. 1A, FIG. 1B, FIG. 1C, FIG. 8A, FIG. 8B, and FIG. 9). The VNS can optionally include a bias estimation module, and/or any other suitable processing modules performing any suitable set of functionalities.

Sensor and data fusion can be executed by each VNS and/or a subset of VNSs. The VNS preferably utilizes a Kalman filter architecture, more preferably an unscented Kalman filter (UKF) architecture, but can additionally or alternatively utilize an extended Kalman filter (EKF) architecture, iterated extended Kalman filter (IEKF), iterated unscented Kalman filter (IUKF) architecture, modified version of a symmetric unscented Kalman filter, central limit theorem (CLT) based approaches (e.g., classical CLT, Lyapunov CLT, Lindeberg CLT, Multidimensional CLT, etc.), Bayesian network (e.g., Bayes network, belief network, Bayesian model, probabilistic directed acyclic graphical model, etc.) based approaches, Dempster-Shafer (e.g., theory of belief functions, evidence theory, etc.) frameworks, convolutional neural networks (CNNs), and/or any other suitable methodologies for representing the probabilistic vehicle state variables and their interrelationships (e.g., to fuse the sensor and data information from the vehicle).

In a first variant, the VNS utilizes a symmetric unscented Kalman filter (SUKF) (e.g., a symmetric Kalman filter, Extended-Unscented-Hybrid Kalman Filter, or Numeric Kalman Filter) which employs an unscented Kalman filter with the additional assumption that the sigma points are symmetric about the operating point within the limits of the perturbations.

In this variant, the state prediction sigma points are computed by passing the state estimate and input sigma points-computed from state perturbations and input perturbations-through the non-linear motion model. Each sigma point occupies a single column in the state prediction sigma point matrix. The sigma points are preferably sampled from half of the distribution, but can additionally or alternatively be sampled from both sides of the distribution (e.g., wherein the distribution's operating point can be the prior mean state estimate from the motion model, etc.). The sigma points can be grouped according to those which arise from positively perturbed state estimates, negatively perturbed state estimate, positively perturbed inputs, and negatively perturbed inputs. In a first variant, the centered state prediction sigma point matrix is computed by removing the mean sigma point (which is used as the nominal state prediction) and weighting the differences according to their distribution. In a second variant, sigma points are evenly weighted and symmetrically distributed relative to the center point (operating point) within the limits of perturbations (e.g., wherein half the sigma points are sampled for use in the motion model).

As shown in FIG. 2, the vehicle navigation system (VNS) 110 is preferably implemented in conjunction with an aircraft (e.g., the system can include an aircraft). In particular, the aircraft is preferably a rotorcraft, but can additionally or alternatively include any suitable aircraft. The rotorcraft is preferably a tiltrotor aircraft with a plurality of aircraft propulsion systems (e.g., rotor assemblies, rotor systems, etc.), operable between a forward arrangement and a hover arrangement. However, the rotorcraft can alternatively be a fixed wing aircraft with one or more rotor assemblies or propulsion systems, a helicopter with one or more rotor assemblies (e.g., wherein at least one rotor assembly or aircraft propulsion system is oriented substantially axially to provide horizontal thrust), and/or any other suitable rotorcraft or vehicle propelled by rotors. The rotorcraft preferably includes an all-electric powertrain (e.g., battery powered electric motors) to drive the one or more rotor assemblies, but can additionally or alternatively include a hybrid powertrain (e.g., a gas-electric hybrid including an internal-combustion generator), an internal-combustion powertrain (e.g., including a gas-turbine engine, a turboprop engine, etc.), and any other suitable powertrain.

As shown in FIG. 2, the VNS 110 is preferably a component of an integrated system 100 of a vehicle (e.g., an aircraft as described above). The VNS is preferably integrated into the system 100 in a feed-forward control configuration, wherein the vehicle state and measurements are fed to the VNS which implements one or more mathematical models of vehicle motion and sensor observations to estimate the future vehicle state (e.g., enabling the flight controller to proactively adjust control variables that can be used to actuate aircraft effectors). However, the VNS can additionally or alternatively be integrated into the FMS in a feedback control configuration in some variations.

The system 100 can include a plurality of individual VNS systems, and the inputs can be divided among the plurality in various ways. For example, the system 100 can include three VNS systems, wherein each VNS receives and fuses all measurements from every sensor aboard the vehicle. In another example, the FMS can include two VNS systems, wherein the first VNS system receives a subset of sensor inputs and the second VNS system receives a distinct subset of sensor inputs. In this example, the sensor inputs can measure duplicative properties (e.g., wherein each VNS receives a full complement of inertial measurements) using non-duplicative sensors (e.g., wherein a first IMU is connected to the first VNS and a second IMU is connected to the second VNS); however, in additional or alternative examples, the sensor inputs can be non-duplicative (e.g., wherein each VNS estimates a portion of the vehicle state based on the properties of the measurements it receives).

Figure 8A:
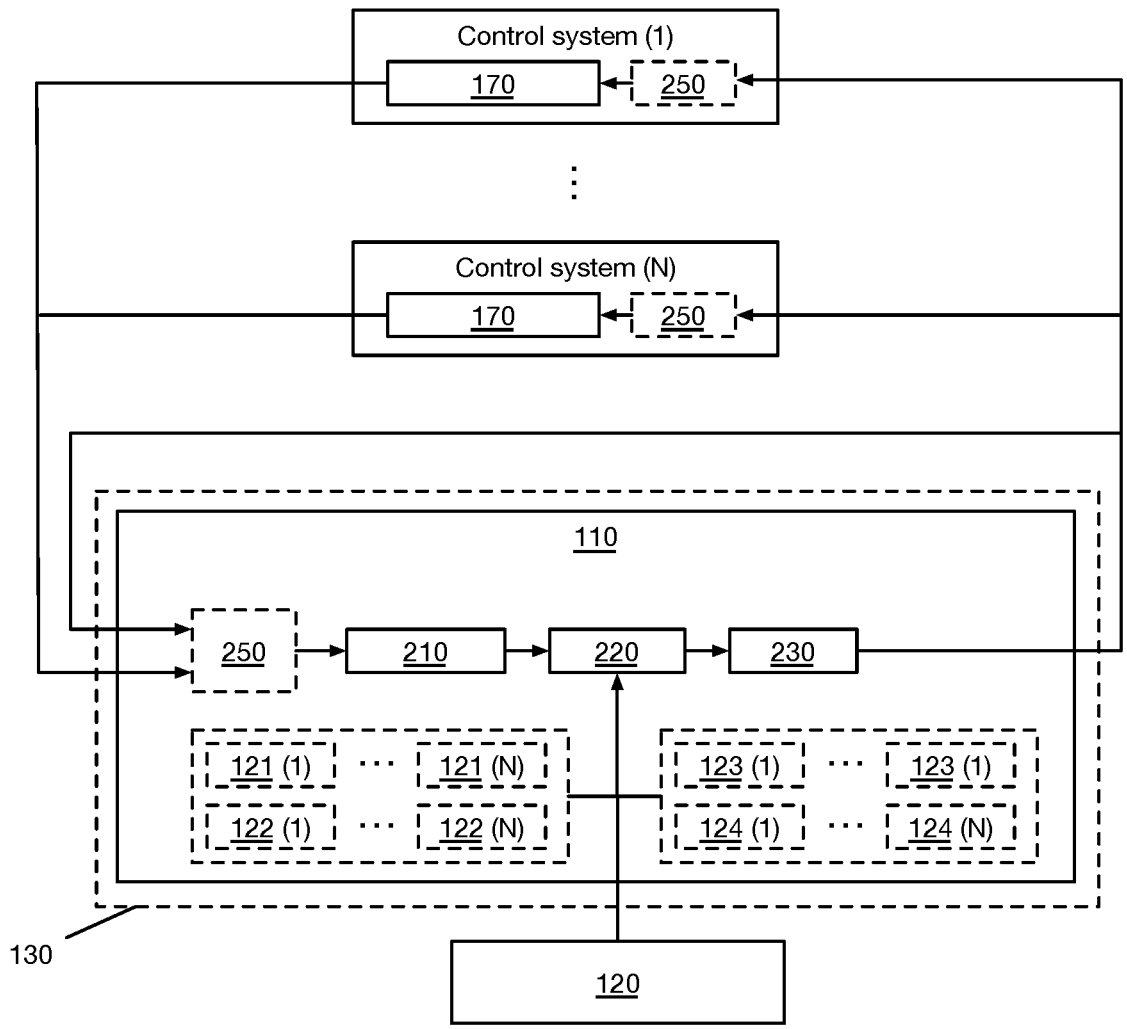
FIG. 8A is a schematic diagram of an aircraft control architecture that includes a variation of the vehicle navigation system.
Figure 8B:
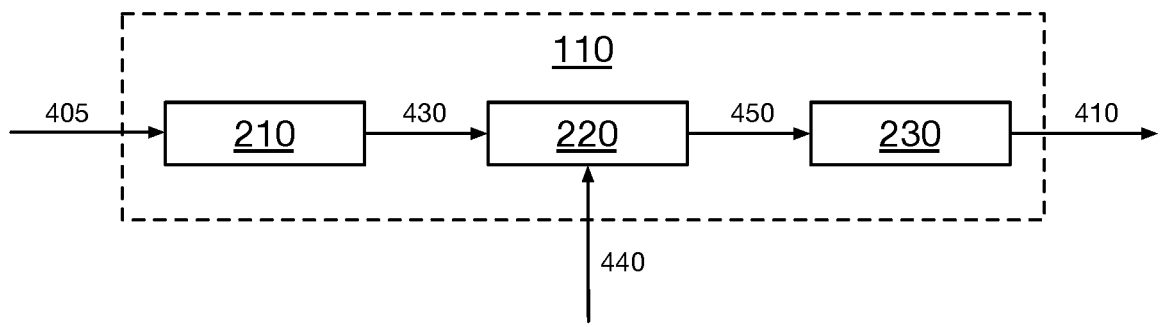
FIG. 8B is a schematic diagram of the sensor fusion in the variation of the vehicle navigation system in FIG. 8A.

The system 100 can include one or more housings 130 that function to enclose, protect, and/or alight at least one VNS and/or a subset of the sensors on the vehicle (e.g., a subset of 120, 120, etc.). Sensors housed with the VNS can include (as shown in FIG. 8A) one or more: IMUs 121, barometers 124 (e.g., with tubes connecting them to the exterior of the aircraft; connected to external pitot tubes, etc.), magnetometers 123, GNSS systems 122, and/or any other appropriate sensors. The housing is preferably a line replaceable unit (LRU), but can alternately be integrated into the vehicle and/or otherwise implemented. The housing is preferably mounted to the vehicle by a set of fasteners and oriented with respect to one or more locating features (e.g., pins, locating faces/surfaces, etc.), but can otherwise mounted to the vehicle. In a first variant, there is one housing associated with each VNS on the vehicle. In a second variant, a single housing encloses all of the VNS systems on the vehicle.

The vehicle controller functions to control effectors of the vehicle (e.g., control surfaces, propulsion units, etc.) in response to operator input (e.g., pilot input, autonomous agent input, etc.). The operator inputs (or input vector) can be used in the motion model, along with the previous state estimate. The control outputs of the flight controller can be represented as a control vector (e.g., a vector of values associated with effector states, the states of actuators associated with effectors, etc.). The control vector is preferably provided to the VNS as an input in a feed-forward configuration, such that the output of the VNS (e.g., an estimate of the vehicle state) is based at least in part on the control inputs used to operate the vehicle. However, the control vector can alternatively be integrated with the VNS in a feedforward/feedback configuration, a feedback configuration, an open loop configuration (e.g., not directly provided to the VNS), or any other suitable configuration.

The set of sensors 120 functions to observe the state of the vehicle. The set of sensors can also function to generates the set of measurements 440 (e.g., aircraft observations) provided to the fault detection module (e.g., as an observation vector). The set of sensors can include air data sensors (e.g., an air data boom, a static-pitot system, pitot probes, pitot-static probes, flush mounted static ports, multi-functional pitot probes, etc.), barometers, actuator encoders that output a signal (e.g., an analog signal, a digital signal) that indicates the position (e.g., angular position, longitudinal displacement, etc.) and/or physical operational state (e.g., power level, RPM, output torque, etc.) information of actuators on the vehicle, IMUs (e.g., accelerometer, gyroscope), magnetometer, GNSS receivers (e.g., compatible with: GPS, GLONASS, Galileo, Beidou, RTK, and/or other regional satellite systems), rangefinders, time-of-flight sensors, radar, lidar, AGL sensors, radio navigation antenna, and/or any other suitable sensors.

Effectors 180 can include actuators for control surfaces (e.g., ruddervators, ailerons, flaps, etc.), components of the propulsion systems (e.g., tilt actuators, blade pitch actuators, electric motors, etc.), and any other suitable effectors for which their state can be reported as an electrical signal (e.g., an analog signal, a digital signal, a scheduled value, etc.) as a component of an observation vector.

The set of sensors 120 can define any suitable subset of sensors, which can be grouped based on: total number of sensors, type of sensors, make/manufacturer of sensors, relative pose of the sensors on the vehicle (orientation and/or location relative to axes, components, and/or vehicle center point), communication pathways between the sensors and/or VNS(s), and/or other characteristics. The sensors can be separated into subsets separating: accelerometer from gyroscopes, front subset of sensors from rear subset of sensors, lidar subset from radar subset, a first IMU manufacturer subset from a second IMU manufacturer subset, a left subset of sensors from a right subset of sensors, a top subset of sensors from a bottom subset of sensors, and/or otherwise separated into subsets.

The set of sensors 120 can be mounted to the VNS and/or to the same housing as the VNS, but can additionally or alternately be mounted to the vehicle and/or otherwise mounted. Sensors can be redundant across the vehicle, redundant per VNS, not redundant, or otherwise redundant. Each sensor or sensor set can be connected to one or more VNSs. In a first variant, each sensor is connected to all of the VNSs. In a second variant, each sensor is connected to a single VNS. In a third variant, each sensor is connected to a subset of VNSs. However, the sensors can be otherwise connected to (and/or transmit sensor observations to) any other suitable set of VNSs.

In variations, one or more of the set of sensors 120 can be integrated with the VNS directly or co-housed with a VNS inside a housing (e.g., as shown in FIG. 8A). For example, the VNS can include a universal asynchronous receiver transmitter (UART) module that includes a 10-axis inertial measurement unit (IMU) and a GPS receiver that output inertial and location data as part of the set of measurements. However, in alternative variations, the set of sensors can be distinct from the VNS with the exception of providing their associated measurements as inputs.

The display 150 functions to provide information indicative of the vehicle state to a user (e.g., vehicle operator, pilot, driver, etc.). The displayed information can include at least part of the estimated vehicle state output by the VNS (e.g., the relative wind velocity decomposed into forward airspeed and lateral shear). The guidance system functions to automatically control the movement of the vehicle based on received inputs. The received inputs can include at least part of the estimated vehicle state output by the VNS.

In a specific example, the vehicle navigation system is integrated with an electric tiltrotor aircraft including a plurality of tiltable rotor assemblies (e.g., six tiltable rotor assemblies). The electric tiltrotor aircraft can operate as a fixed wing aircraft, a rotary-wing aircraft, and in any liminal configuration between a fixed and rotary wing state (e.g., wherein one or more of the plurality of tiltable rotor assemblies is oriented in a partially rotated state). The control system of the electric tiltrotor aircraft in this example can function to command and control the plurality of tiltable rotor assemblies within and/or between the fixed wing arrangement and the rotary-wing arrangement.

The system 100 can include a set of software modules which function to execute method S100 wholly or in part.

The sensor fusion for the system 100 can include a prediction module that functions to transform the current vehicle state vector into a state prediction, based on a motion model and/or a control vector. The prediction module can additionally or alternately function to execute Silo. The control vector is preferably received from a flight controller as described above. The motion model is preferably a dynamical or kinematic model of the vehicle dynamics, and is a function of the control inputs (e.g., represented by the control vector) and the state of the vehicle (e.g., the vehicle state vector). The motion model can be determined in various ways. For example, the motion model can be based on flight simulation and/or flight testing, wherein the aircraft response to control inputs is computed and/or directly measured. In another example, the motion model can be calculated based on control theoretical principles. However, the motion model can be otherwise suitably determined. The motion model can be nonlinear or linear. The motion model can be a tightly-coupled model (e.g., that tightly couples all or a subset of the output variables), a set of decoupled models, and/or otherwise constructed. Examples of output variables, output by the model, can include predictions for: position, attitude, linear velocity, angular velocity linear acceleration, sensor observations, and/or any other suitable variable.

Figure 4:
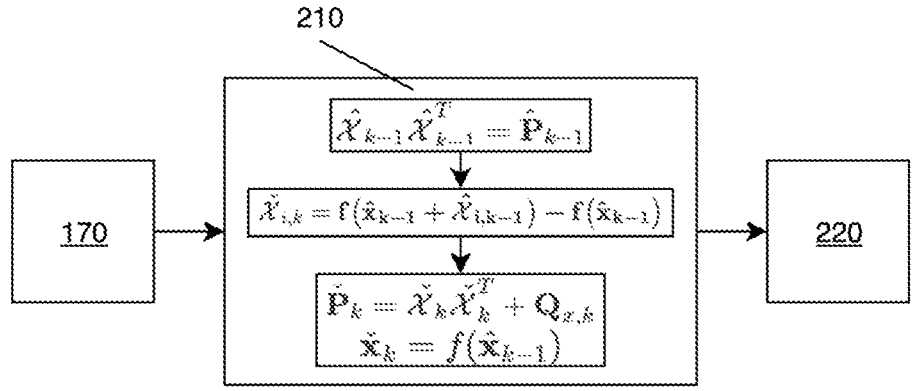
FIG. 4 is a block diagram of an example implementation of the prediction module of a variation of the vehicle navigation system.

In a specific example implementation of the prediction module, as shown in FIG. 4, the current state estimate $\hat{x}$ is associated with an a posteriori covariance matrix estimate $\hat{P}$, which can be decomposed into an operator $\hat{L}$ such that (where $Q_u$ is the input noise covariance and $\hat{L}_u$ is used to generate input sigma points $\hat{U}$):

$\hat{L}\hat{L}^T = \hat{P}$, $\hat{L}_u \hat{L}_u^T = Q_u$ and $\hat{\chi}_i \leftarrow \hat{x} \boxplus \hat{L}_i$ and $\hat{U}_i \leftarrow u \boxplus \hat{L}_{u,i}$. The motion model f is applied to the resulting matrix $\chi$ to obtain (for sigma points U)

$\check{\chi} = f(\hat{\chi}, \hat{U})$ (for SUKF: $\check{\chi} = f(\hat{\chi}, u) - f(x, u)$)

as a function of the control vector u, wherein $\check{\chi}$ is the predicted state matrix (wherein $\check{\chi}_i \leftarrow \check{x} \boxplus \check{L}_i$). A prediction for the a posteriori covariance matrix, $\check{P}$, is thus obtained via $\check{P} = \check{\chi}\check{\chi}^T + Q$, wherein Q is the covariance of the process noise associated with the state prediction. In this example, the output of the prediction module is thus a predicted vehicle state vector $\check{x} = f(\check{x}, u)$ and a predicted a posteriori covariance matrix $\check{P} = \check{\chi}\check{\chi}^T + Q$.

In UKF (unscented Kalman filter) variants, the predicted vehicle state vector is instead calculated as $$\check{x} = \frac{1}{N} \sum \hat{\chi}_i.$$

However, the prediction module can be otherwise suitably implemented.

The system 100 can include a measurement prediction module that functions to transform the predicted state into a predicted observation (e.g., predicted measurement). The measurements within the measurement prediction model can be: coupled, tightly coupled, decoupled, linear, nonlinear, or otherwise configured. The measurement prediction vector can include the predicted outputs of the set of sensors, some of which can be integrated with the VNS itself (e.g., in a UART including an IMU and a GPS receiver) and others of which can be located throughout the aircraft (e.g., actuator encoders, air data sensors, etc.). The measurement prediction module can output a prediction for each: sensor (e.g., used by the VNS), redundant sensor set, sensor cluster, and/or other set of sensors.

The system 100 can include a fault detection module which functions to determine which updated set of measurements (e.g., current sensor observations, real sensor observations, actual sensor observations) to use for the updated vehicle state estimate. The fault detection module can additionally or alternately function to execute S130. The fault detection module identifies aberrant (e.g., outlier) observations that have affected the measurement prediction, and/or to ignore (e.g., reject, disregard, etc.) aberrant observations. In cases where there are no outliers, the fault detection module passes the set of measurement predictions to the update module as inputs. The fault detection module can also function to identify systematic failures in the set of sensors (e.g., wherein a specific sensor provides a measurement that is consistently aberrant based on the observation model prediction and/or historical sensor performance, indicating that the sensor has malfunctioned).

In a specific example, the fault detection module computes the covariance matrix of the predicted observation residual vector, and rejects any measurements associated with covariance values greater than a corresponding threshold. The corresponding threshold can be based upon the source of the observation (e.g., wherein a GPS sensor may have a corresponding high threshold to designate an outlier measurement due inherently high variance in the measurement), but can be otherwise suitably determined. However, in additional or alternative examples, the fault detection module can otherwise suitably perform fault detection.

In a second specific example, the fault detection module performs a chi-squared test, which includes the predicted measurement covariance. The fault detection module can reject measurements based on any suitable threshold for the chi squared test.

When outliers are identified, the measurement predictions can be: removed from the measurement prediction set; used to remove corresponding actual measurements from the actual measurement set; corrected (e.g., using the measurement prediction module, using a secondary correction module, etc.); or otherwise managed. In some variants when outliers are identified, the measurement predictions can be recomputed (e.g., by the measurement prediction module, by the motion model) without the outlier observations.

The fault detection module can optionally output measurement weights, wherein the weights can subsequently be used by the update module. In one example, the weights are used to dynamically update the measurement noise covariance used in the observation model, where the observation model calculates the innovation covariance based on the measurement noise covariance. The innovation covariance is then used to determine the Kalman gain. However, the weights can be otherwise used. The weights can be: per measurement, per sensor, per sensor or measurement type or class, per sensor set (e.g., predetermined; sharing a common characteristic; sharing a common observation; etc.), or otherwise assigned. In one example, the weights are determined such that measurements that are more correlated are weighted higher than outliers (e.g., if the outliers weren't rejected). In a second example, the weights can be the weights used to compute a weighted average of all measurements of the same type (e.g., a weighted average for all gyroscope measurements). In a third example, the weights can be determined using a set of rules or heuristics. In a fourth example, the weights can be assigned by a neural network (e.g., that determines an observation accuracy confidence level per measurement). However, the weights can be otherwise determined.

The system 100 can include an update module which functions to determine an updated vehicle state estimate based on the updated set of measurements and the vehicle state prediction. The update module can include: an observation model, a Kalman gain, a state estimate correction, and/or any other suitable elements. In one example, the update module determines an updated vehicle state based on: the predicted vehicle state (e.g., output by the prediction module), optionally the predicted measurement set (e.g., output by the prediction module or measurement prediction module), and the corrected measurement set. The update module can additionally or alternately function to execute S140. The update module can also function to determine the relative certainty of the measurements (e.g., observations of the aircraft state) and the current state estimate, and update the state estimate based on the determined relative certainty. In some example implementations, the relative certainty can be represented in terms of the gain (e.g., Kalman gain) applied to the output of the fault detection module (e.g., the predicted state estimate and predicted observation residual). The gain can be adjusted based on the desired relative weight between the measurements and the current state estimate; with a high gain, the output of the update module (and, thus, the VNS) is more responsive to the most recent measurements, whereas with a low gain, the output will adhere more closely to the predicted vehicle state. In some variations, the gain can be predetermined. In additional or alternative variations, the gain can be dynamically adjusted (e.g., based on a number of detected system faults by the fault detection module).

Figure 6:
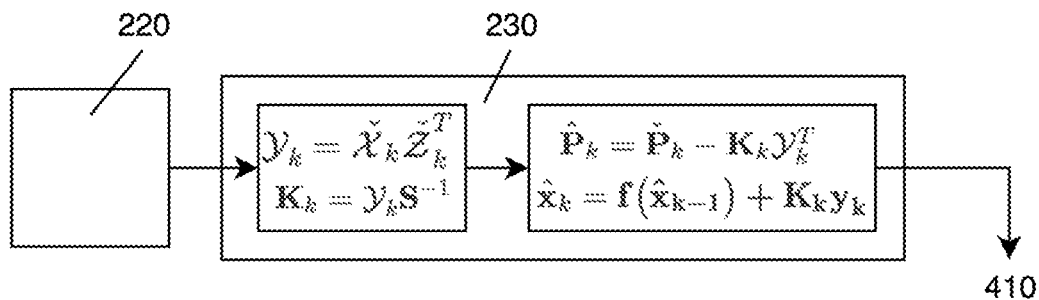
FIG. 6 is a block diagram of an example implementation of the update module of a variation of the vehicle navigation system.

As shown in FIG. 6, a specific example of the update module includes a gain block and a correction block. In the gain block, the gain (e.g., the Kalman gain) K is computed based on the predicted vehicle state matrix and the predicted observation matrix (e.g., computed by the prediction module), e.g.:

$K = \check{Y}\check{S}^{-1}$, wherein $\check{Y} = \check{\chi}^T$.

In the correction block of this specific example, the new state estimate $\hat{x}$ and new a posteriori covariance matrix $\hat{P}$ are computed based on the gain K and the predicted observation state vector and matrix, e.g.:

$\hat{x} = \check{x} \boxplus K\hat{y}$ and $\hat{P} = \check{P} - K\check{Y}^T$. Thus, in this specific example, the outputs of the update module are the vehicle state vector estimate and the a posteriori covariance matrix thereof.

However, the update module can be otherwise suitably implemented.

Figure 11:
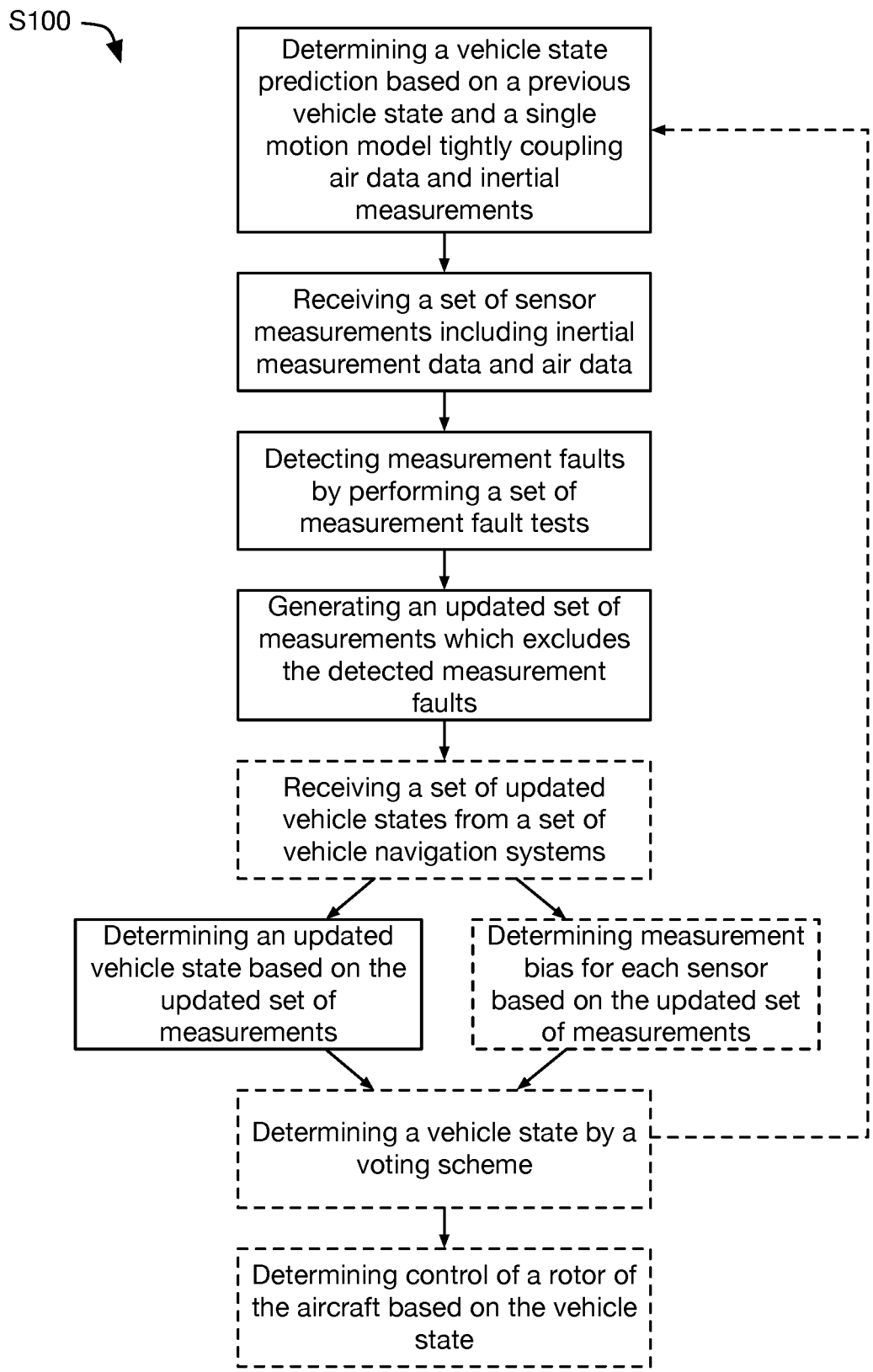
FIG. 11 is a flowchart diagram of an example of a vehicle navigation method.
Figure 12:
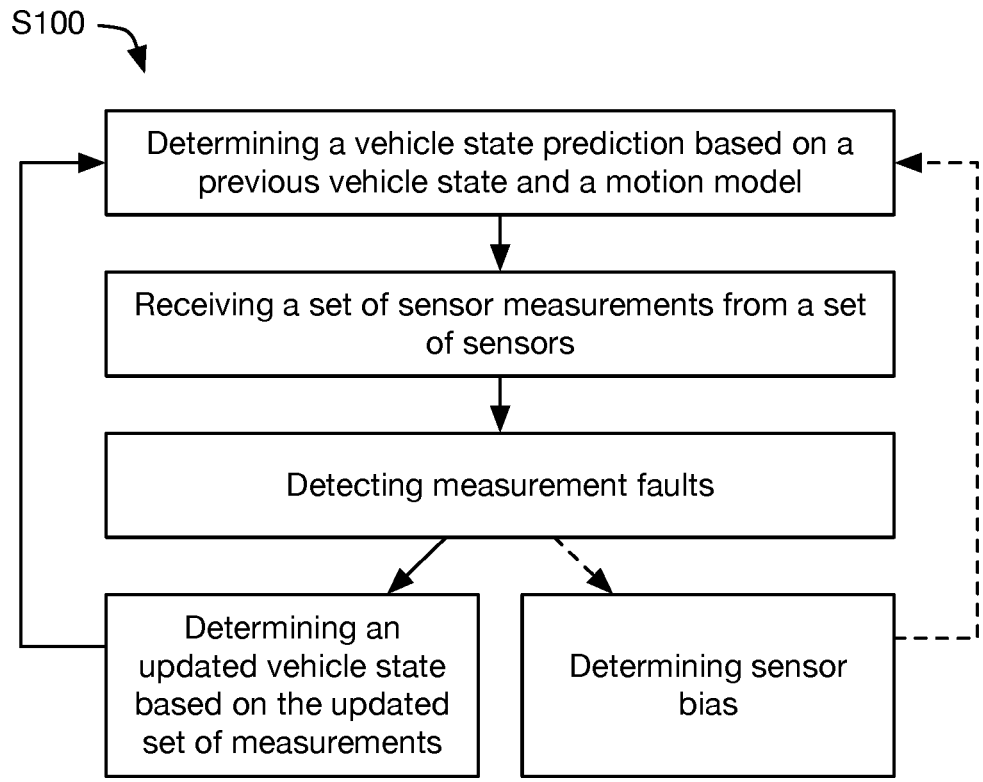
FIG. 12 is a flowchart diagram of an example of a vehicle navigation method.

The system 100 can optionally include a bias estimation module which functions to reduce the effect of sensor or measurement bias in observations (examples are shown in FIG. 11 and FIG. 12). The bias estimation can be executed as a subprocess of the sensor fusion, can execute in a partitioned Kalman filter, execute outside of the primary Kalman filter, and/or be otherwise related to the main Kalman filter. In variants, bias prediction, estimation, and/or covariance determination can be coupled with or decoupled from the other state variables in: the motion model, the fault detection model, and/or the observation model (e.g., in the estimate correction portion and/or the covariance correction portion of the observation model). Alternatively, the bias can be determined in a separate bundle adjustment, or otherwise determined.

The biases can be: randomly determined, determined using a Monte Carlo sequence (e.g., a low discrepancy sequence), determined using a predetermined model (e.g., for all biases, for a single bias, for a set of biases, etc.), not determined, or otherwise determined.

In a first specific example, the biases are assumed to be linear, with the biases are modeled as random walks which are not covariant with each other or the other vehicle state variables (off-diagonals of the covariance matrix are zero between each bias and the other state variables).

In a second specific example, the biases are treated as state variables (in the main filter) for the measurement fault detection, correction, and update processes, and decoupled from the state variables for state prediction and covariance updating. In this example, the bias estimates (output by the observation model) and the updated bias covariances (output by a bias covariance update module, separate from the observation model and/or main covariance update module) from the prior time step can be used for the current time step's measurement fault detection, measurement correction, state estimation, and/or state covariance updating. However, any other suitable bias (and/or bias covariance), determined in any other suitable manner, can be used. However, the biases can be otherwise determined.

In a first variant, the bias estimation module separately determines a bias update (correction) to each bias prediction (estimate) covariance, wherein the bias estimate is determined as part of the update (correction) for all state variables (e.g., determined by the observation module). Separately computing the bias update for each sensor separately can improve the computational efficiency because the conventional Kalman Filter algorithm is $N^3$ in computational complexity, where N is the dimension of the state-space (each of the inertial sensors used in the Kalman filter has a bias with three dimensions). As a first example: estimating position, attitude, linear velocity, angular velocity and linear acceleration has state space of 15 and the system includes 9 inertial sensors to do this (3 gyroscopes, 3 accelerometers, 3 magnetometers). Estimating all of the inertial biases in a conventional Kalman filter would add 27 to the state space dimensions, for a total of 42—for $N^3$ computational complexity this yields $42^3 = 74,088$. By partitioning the computation of the sensor biases in the first example, computing with N 3 computational complexity yields 9*3 3+ 15 3=3,618. This can enable the partitioned Kalman filter in the bias estimation module to run serially and/or in parallel with the estimation of state variables. Bias estimations computed within the bias estimation module can be computed in serial (e.g., on a single processor core) or in parallel (e.g., across multiple processor cores, on a single processor core, etc.).

In a second variant, the biases for a subset of the sensors are computed using a complimentary filter and/or other filtering approach in conjunction with the Kalman filter (and/or partitioned Kalman filter) in the first variation.

In a third variant, the bias estimation module determines sensor bias by manual and/or automatic calibration of one or more sensors relative to a known reference and/or another sensor (or set of sensors) on the vehicle. Calibration can occur with any appropriate frequency (e.g., periodically, upon initial installation of a sensor, etc.).

The bias estimation module can compute the biases of: magnetometers, accelerometers, gyroscopes, barometers, and/or any other suitable set of sensors. The bias estimation output from the bias estimation module can be used in the observation model (in the update module) and/or motion model.

The system 100 can include a voting module which functions to determine a vehicle state from a set of vehicle state estimates and can additionally or alternately function to execute S160. The voting module can execute as a software module at any endpoint receiving a vehicle state estimation, which can include: the VNS(s), guidance systems, displays, control input mechanisms, flight controllers, and/or other suitable components. Instances of the same voting module (e.g., the same voting algorithm) are preferably implemented at the various components mentioned above. Alternatively, different voting modules (e.g., different voting algorithms) can be used by different components.

In a specific example, the voting module selects a vehicle state from the set of vehicle state estimates.

However, the voting module can be otherwise suitably implemented.

In a first specific example, the system includes: a plurality of sensors arranged onboard the vehicle configured to generate a set of contextual vehicle measurements and a vehicle navigation system communicatively connected to the plurality of sensors. The plurality of sensors includes a first sensor subset and a second sensor subset, wherein the second sensor subset is redundant with the first sensor subset (e.g., same type of sensors, different types of sensors measuring the same vehicle parameter, etc.). The vehicle navigation system includes: a voting module, a prediction module, a fault detection module, and an update module. The voting module is configured to determine a previous vehicle state from a set of received vehicle states based on a voting scheme. The prediction module is configured to generate a vehicle state prediction (e.g., a measurement prediction for each of the set of contextual vehicle measurements) based on the previous vehicle state and a single motion model. The fault detection module is configured to detect a set of measurement faults within the set of contextual vehicle measurements and generate an updated set of contextual vehicle measurements excluding the set of measurement faults. The fault detection module can detect faults based on the measurement prediction for each of the set of contextual vehicle measurements and/or by other tests. The update module is configured to determine an updated vehicle state based on the updated set of contextual vehicle measurements, the vehicle state prediction, and an observation model. However, the system can be otherwise configured.

4. Method.

Figure 7:
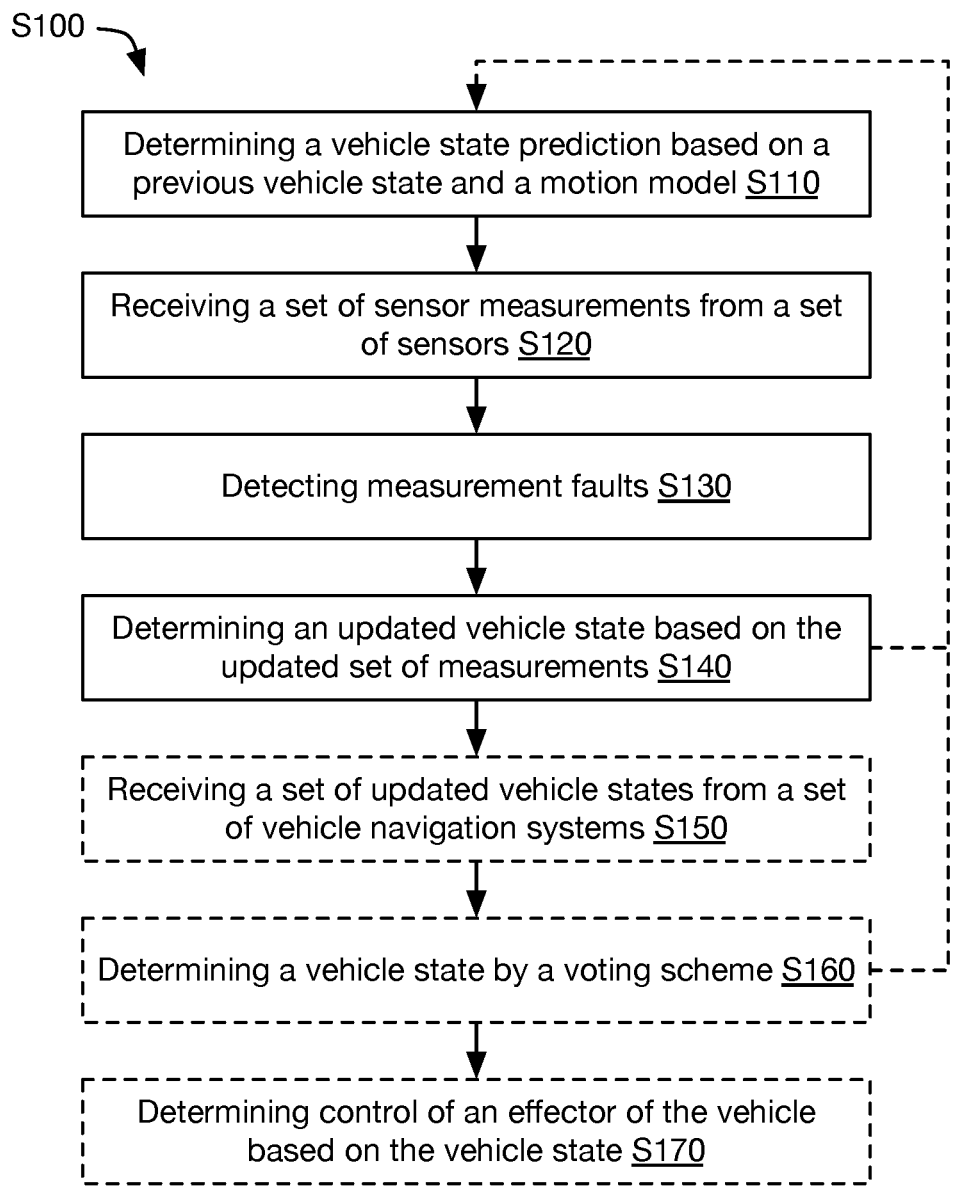
FIG. 7 is a flowchart diagram of a vehicle navigation method.

The method S100 (an example is shown in FIG. 7) can include: determining a vehicle state prediction based on a previous vehicle state and a motion model S110, receiving a set of sensor measurements from a set of sensors S120, detecting measurement faults S130, and determining an updated vehicle state based on the updated set of measurements S140. The method can optionally include receiving a set of updated vehicle states from a set of vehicle navigation systems S150, determining a vehicle state by a voting scheme S160, determining control of an effector of the vehicle based on the vehicle state S170, and/or include any other suitable processes.

The method S100 can be performed with any appropriate measurement and/or computational frequency. The computational and/or measurement frequency can be: 1 Hz, 3 Hz, 5 Hz, 10 Hz, 30 Hz, 50 Hz, 100 Hz, 300 Hz, 500 Hz, 1000 Hz, 3000 Hz, 5000 Hz, >5000 Hz, and/or any appropriate frequency. The method S100 is preferably performed by one or more system components (and/or software modules) operating in series, parallel, and/or any combination thereof. The method can be performed by the same or different: processor, core, chipset, or other computing hardware. Different processes of the method can be performed in series (e.g., which can enable easier certification), in parallel, and/or a combination thereof. In some variants, method S100 can be performed iteratively at one or more time steps. For each time step, there can be one iteration or multiple iterations until a set of convergence criteria are met. In a specific example, the method employs an IUKF.

Determining a vehicle state prediction based on a previous vehicle state and a motion model S110 functions to establish a predicted (a priori) state estimate and a predicted (a priori) estimate covariance. The input of S110 is a previous vehicle state 405 which can be a vehicle state output by the VNS at the same/preceding time step (e.g., 410 at a previous time step) or the voted vehicle state determined per S160. S110 can employ a single motion model for the vehicle and/or multiple motion models.

In a first variant, S110 uses a single motion model which tightly couples: linear acceleration, angular velocity (and/or angular acceleration), air data, and/or other vehicle state parameters.

In a second variant, S110 uses multiple motion models associated with different vehicle state parameters in S110 (e.g., propeller model). In a first example, a first motion model includes air data measurements and a second motion model includes linear acceleration.

Receiving a set of sensor measurements from a set of sensors S120 functions to provide measurement feedback to enable execution of vehicle control. S120 can occur via wired connections, wireless connections, and/or via any other suitable connection. The connections between the sensors and the VNS can be redundant, non-redundant, or include any appropriate communication redundancy. Sensor measurements can be received from: a VNS executing S120, a different VNS, a separate vehicles, a database, and/or any other suitable data source. Sensors measurements can be synchronized and/or asynchronized, timestamped (e.g., received as a timeseries), and/or otherwise received. In a first variant, a set of sensor measurements (e.g., those related to sensors packaged with a second VNS) can be received at a first VNS from a second VNS. In a second variant, a set of sensor measurements can be received at a VNS from an external sensor of the aircraft (e.g., a sensor on the exterior of the aircraft, a sensor packaged distal a VNS).

Figure 13:
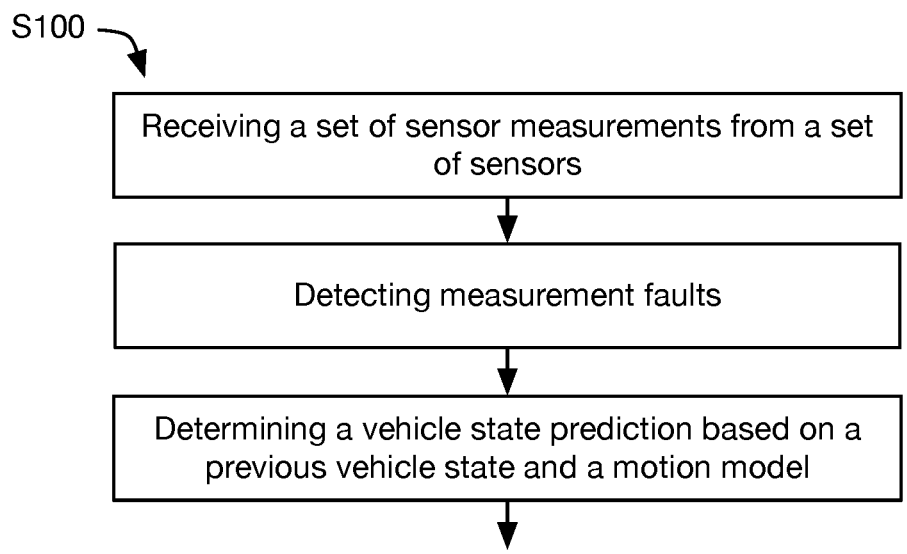
FIG. 13 is a flowchart diagram of an example of a vehicle navigation method.

Detecting measurement faults S130 functions to determine the measurements that can be used in S140 (an example is shown in FIG. 13). S130 can include one or more tests to detect measurement faults, which can include: detecting measurement faults in an individual sensor measurement, detecting measurement faults in a set of sensor measurements sharing a common failure mode, detecting outliers, and/or otherwise detecting faulty measurements. Detecting measurements faults in an individual sensor measurement can include: comparing a measurement to a similar sensor measurement, comparing a sensor measurement to voted average of all similar sensors measurements, comparing a measurement to a voted average of all identical sensors, comparing a measurement to a measurement prediction (e.g., innovation test) and/or any other appropriate individual sensor measurement tests. Detecting faults in a set of sensor measurements sharing a common failure mode can include comparing a first subset of sensors to a second subset of sensors (e.g., wherein the first-second sensor subset pair can be automatically determined, predetermined, randomly determined, or otherwise determined). The subsets can be: grouped by redundancies, grouped by dissimilarities, grouped by similarities (e.g., similar characteristics, sensor types, etc.), or otherwise determined. One or more tests (comparisons), can additionally or alternately serve as a tie-breaker between common failure modes, determining which of subset of the sensors should be rejected if a common mode failure is detected.

Detecting measurement faults can additionally or alternately compute any of the aforementioned comparisons against a rolling average: mean, median, and/or similar metric of central tendency of a set of sensors (such as time weighted average). The rolling average tests can have any appropriate time window relative to the rolling average (e.g., on order of seconds, minutes, hours, days, etc.).

Inputs to S130 can include: a set of raw measurements (e.g., before they are passed into a filter, as they are passed into a filter, such as the observation model), measurement predictions (e.g., for each of the set of sensors, for each of the set of measurements, etc.), measurement covariances, and/or any other suitable input.

S130 can occur before, during, and/or after S130. In a first variant, S130 occurs before sensor fusion. In a second variant, part of S130 occurs before sensor fusion and part of S130 occurs during sensor fusion. In a third variant, occurs during sensor fusion (e.g., between prediction and update).

S130 can optionally generate an updated set of measurements based on detected measurement faults. The updated set of measurements is the output of S130, and serves as the input to the S140. Preferably, generating a new set of updated measurements can include excluding (reject) faulty measurements from the updated measurement set; however, in some cases, it can be undesirable to reject more than a threshold number of measurements of a certain type (e.g., inertial measurements) because they are essential for control (and it is unlikely that a failure will be experienced in every sensor simultaneously). In a first variant, S130 will not reject (where the sum of accelerometers and gyroscopes on the vehicle is N) 2N−1 accelerometer and gyroscope measurements (e.g., rounded up to a whole number, rounded down to a whole number, etc.) in the same time step and/or iteration.

In a first example, S130 includes: performing one or more individual sensor tests (e.g., as discussed above); flagging sensors with failures; and selectively heeding or ignoring the failure flag based on the population and/or the test resulting in the failure flag. In a first specific example, for an individual sensor, if similar measurement 2-test fails for all similar sensors, the sensor (or measurement thereof) is flagged as to be rejected. In a second specific example, when less than N/2 sensors are flagged with failures, the flagged sensors (or measurement thereof) can be rejected.

In a second example, S130 includes: for identical sensor groups, identifying the worst sensor (e.g., lowest weight and/or furthest from group mean), and re-computing the group mean and variance without the worst sensor. This can drop the identical sensor groups to be 1-fewer, which is robust to a common mode failure (all identical sensors of one type failing the same way) simultaneously with a single failed sensor of the other identical type.

In a third example, S130 includes: comparing the voted average of all identical sensors with the voted average of all identical sensors (after dropping one sensor from each group) to detect a common mode failure, and using the measurement versus the measurement prediction (e.g., innovation) as a tie breaker In a fourth example, S130 includes: comparing the voted average of all identical sensors with the voted average of all similar sensors test (e.g., with the remaining means after dropping one sensor from each group) as a check for a common mode failure.

In a fifth example, S130 includes: when no common mode failure is detected, using an innovation-test and identical-innovation test to reject the common mode sensors that failed, and keeping the M best sensors with lowest innovation (or minimum weighted average between innovation score, similar-measurement test score, etc.) where $M>=N/2-1$.

In a sixth example, S130 includes a combination or series of the first through fifth examples (e.g., as part of a serial cascade). However, S130 can be otherwise performed.

S130 can be implemented by: storing a flag to indicated receipt of new data, computing the observation model and the innovation of all measurements with the new data, detecting measurement faults in the new data (where a failure measurement can be set invalid such that it's not used in the filter), storing a list of each different type of sensor in the measurement group to be used for similar sensor fault detection, and performing similar/dissimilar-measurement rejection in the sensor suite (only computing the innovation for variables that have already passed through the sensor suite). However, S130 can be otherwise implemented.

S130 can optionally assign weights to each of the set of sensor measurements according to the degree of correlation of measurements, wherein the weights can subsequently be used by the update module. The weights can be determined as discussed above (with respect to the fault detection module), but can be otherwise determined.

Determining an updated vehicle state based on the updated set of measurements S140 functions to output an updated vehicle state 410 associated with the current time step. S140 uses the observation model to update the vehicle state for the time step of the measurements and/or adjust for a delay between the time of the measurement and the time of the state.

The observation model is preferably a dynamical model of the relationship between direct measurements of the aircraft state and the aircraft dynamics, and is a function of the observations (e.g., represented by the observation vector) and the predicted state of the aircraft (e.g., the vehicle state vector). The observation model can be determined in various ways. For example, the observation model can be based on flight simulation and/or flight testing, wherein the sensor measurements associated with various aircraft dynamic responses are computed and/or directly measured. In another example, the observation model can be calculated based on control theoretical principles and theoretical models of the various sensors of the set of sensors. However, the observation model can be otherwise suitably determined.

Figure 5:
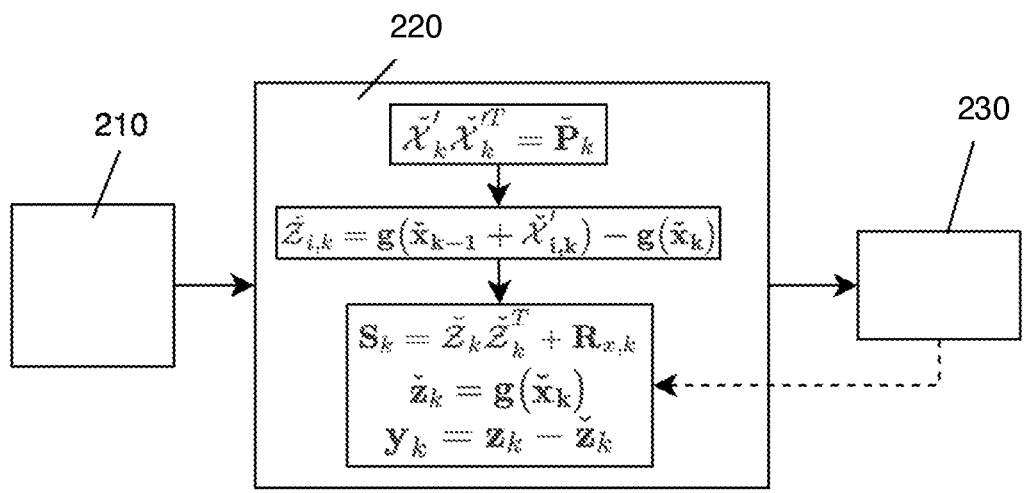
FIG. 5 is a block diagram of an example implementation of a variation of the vehicle navigation system.

In a specific example implementation, as shown in FIG. 5,

A predicted observation vector $\check{z}$ is computed from the predicted observation matrix (for observation model h) e.g.:

$\check{z}=h(\check{x})$ the predicted vehicle state matrix $\check{\chi}$ is transformed into a predicted observation matrix using the observation model h, e.g.:

$=h(\check{\chi})-h(\check{x})$.

A predicted a posteriori covariance matrix $\check{S}$ is computed to give $\check{S}=^T+R$, wherein R is the covariance of the observation noise associated with the measurement prediction. A predicted observation residual vector $\check{y}$ is also computed using the received observation vector z, e.g.:

$\check{y}=z-\check{z}$. In this example, the output is thus a predicted observation residual vector y and predicted a posteriori covariance matrix $\check{S}$.

In a second specific example, $\hat{L}\hat{L}^T=\hat{P}$ is repeated (using Cholesky decomposition), and the the columns of L are used to generate the sigma points $X=x+L$ in a similar approach to the motion model, but instead using the state prediction covariance for Cholesky decomposition instead of the state estimate covariance.

In a first variant, the observation model assumes constant acceleration (e.g., uses the acceleration prediction in conjunction with other state variables) and integrates backwards to the time of the measurement, from the time of the state, using the rates of change of state variables. However, the observation model can otherwise estimate the current state variable values.

In a second variant, the observation model integrates forwards in the time depending on the choice of the time of the state estimate. However, the observation model can otherwise estimate the current state variable values.

The method can optionally include receiving a set of updated vehicle states from a set of vehicle navigation systems S150, which can function as the input for one or more endpoints on the vehicle. In a first variant, the updated vehicle state is received by the VNS as the input (previous) vehicle state for a subsequent instance of the method S100. The VNS receiving and using the updated vehicle state (from the prior time step) can be: the same VNS that determined the updated vehicle state, a different VNS (e.g., a redundant VNS to that determining the updated vehicle state), and/or be any other suitable VNS. In a second variant, the updated vehicle state is received by a vehicle guidance system, flight controller, display, input mechanism, and/or other endpoint(s) to perform aircraft control or other functions. S150 can occur synchronously and/or asynchronously between various endpoints and/or VNSs, with any appropriate communication frequency. S150 can occur: continuously, in discrete time intervals (periodically/aperiodically), upon convergence of an iterative sensor fusion approach, and/or with any other timing or relationship.

The method can optionally include determining a vehicle state by a voting scheme S160, which can function to select a vehicle state for use from various vehicle state candidates (e.g., output by redundant VNSs or instances of the method). S160 preferably occurs in response to S150 at each endpoint performing S150, but can alternately occur at any suitable subset of endpoints.

In variants, S160 can include, for a number (N) of VNSs each generating a D-dimensional vector, the voting scheme processes N D-dimensional vectors and N D×D covariance matrices. In a first example, there are four VNSs each generating a 3-dimensional state estimate, with four associated 3×3 covariance matrices. In a second example, each VNS outputs a list of vehicle state including: a 3-dimensional geodetic position with an associated 3×3 covariance matrix, a 3-dimensional attitude from the body to NED with an associated 3×3 covariance matrix, a 3-dimensional linear velocity in NED with an associated 3×3 covariance matrix, a 3-dimensional angular velocity in the body coordinate frame with an associated 3×3 covariance matrix, and/or a 3-dimensional linear acceleration in the body coordinate frame with an associated 3×3 covariance matrix.

S160 preferably takes in as an input a vehicle state (e.g., updated vehicle state 410) from a plurality of VNS systems and outputs a vehicle state. S160 can optionally output a VNS identifier which can be associated with: a selected signal (or set of signals), a signal which was rejected and/or low health, and/or otherwise identify one or more VNS signals.

The vehicle state can be selected from the set of vehicle state candidates using: a majority voting scheme, a scoring scheme (e.g., wherein each vehicle state candidate is scored, such as based on its distance from the remaining vehicle state candidates, wherein the vehicle state candidate with the highest or lowest score is selected as the vehicle state), or any other suitable scheme. The vehicle state is preferably selected based on the vehicle state vector (e.g., state variable values), the associated covariances, and/or any other suitable data.

In a first variant, the voting scheme can employ an algorithm which weights the respective vector inputs relative to the distance of each signal (e.g., Bhattacharyya distance) relative to the population.

In a second variant, the voting scheme can employ a vectorized raw signal voting algorithm which weights the respective vector inputs relative to the Mahalanobis distance of each signal relative to the population, where the input covariances are assumed to be equivalent.

In a third variant, the voting scheme can additionally or alternately accept a set of scalar inputs (e.g., redundant signal from multiple communication channels), where the covariance matrices are the zero matrix, the vectorized raw signal algorithm can operate as the raw signal voting algorithm described in U.S. application Ser. No. 16/573,837 filed 17 Sep. 2019, which is incorporated in its entirety by this reference.

The voting scheme can further determine an associated health of each input based on the relative weight of the signal, the distance (e.g., Mahalanobis, Bhattacharyya, etc.) of the signal relative to the distances of other signals in the population, and/or otherwise compute the health of input signals. In variants, the voting scheme can reject a signal from the population which is determined to have poor health and/or associate a low relative weight to the signal.

The voting scheme can operate at any suitable endpoint(s) and/or in conjunction with another (scalar) voting scheme for redundant communication connections between any appropriate set of components.

The method can optionally include determining control of an effector of the vehicle based on the vehicle state S170, which can function to implement an effector control to affect the vehicle state. Preferably, the control of the effector is implemented in a control-by-wire, drive-by-wire, or fly-by-wire scheme, but can be otherwise implemented. In a first variant, the vehicle can enable direct control of effector(s) of the aircraft based on the vehicle state, such as with a prescribed flight envelope. The specific effector(s) can be: a flap, rotor blade, a rotor blade pitching mechanism, rotor-tilt mechanism, motor RPM, set of control surfaces, and/or any other appropriate effectors. In a second variant, the aircraft can control one or more parameters of the vehicle state rather than the specific position/behavior of the effector. In a specific example, the aircraft can control the desired aircraft response described in U.S. application Ser. No. 16/708,367 filed 9 Dec. 2019, which is incorporated in its entirety by this reference. However, vehicle control can be otherwise effected.

In a specific example, the method includes: determining a vehicle state prediction based on a single motion model and a previous vehicle state; receiving a set of contextual measurements from a plurality of sensors, the plurality of sensors comprising: a first sensor subset and a second sensor subset, the second sensor subset redundant with the first sensor subset; for each measurement in the set of contextual measurements, determining a measurement prediction with the vehicle state prediction; detecting a measurement fault within the set of contextual measurements based on the measurement prediction and, in response to detecting a measurement fault, updating the set of contextual measurements; determining an updated vehicle state based on the vehicle state prediction, the set of contextual measurements (e.g., measurements from the set of sensors), and an observation model; and determining a voted vehicle state from a set of updated vehicle states by a voting scheme.

The system and/or method of the preferred embodiment and variations thereof can be embodied and/or implemented at least in part as a machine configured to receive a computer-readable medium storing computer-readable instructions. The instructions are preferably executed by computer-executable components preferably integrated with and/or part of the system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

What is claimed is:

1. A system for a vehicle comprising:
a plurality of sensors arranged onboard the vehicle configured to generate values for a set of contextual vehicle measurements, wherein the set of contextual vehicle measurements comprises inertial measurements and non-inertial measurements generated by inertial sensors and non-inertial sensors, respectively, the plurality of sensors comprising: a first sensor subset and a second sensor subset, wherein the second sensor subset is redundant with the first sensor subset; and
a first vehicle navigation system communicatively connected to the plurality of sensors comprising:
a voting module configured to determine a previous vehicle state from a set of received vehicle states based on a voting scheme;
a prediction module configured to generate a vehicle state prediction based on the previous vehicle state and a single motion model coupling the inertial measurements with the non-inertial measurements, wherein the vehicle state prediction comprises a prediction value for each of the set of contextual vehicle measurements;
a fault detection module configured to detect a set of measurement faults, within the set of contextual vehicle measurements, based on the prediction value for each of the set of contextual vehicle measurements, wherein the fault detection module is configured to generate an updated set of contextual vehicle measurements excluding the set of measurement faults; and
an update module configured to determine an updated vehicle state based on the updated set of contextual vehicle measurements, the vehicle state prediction, and an observation model.

2. The system of claim 1, further comprising a vehicle controller communicatively connected to the processing system, the vehicle controller configured to control the vehicle based on the updated vehicle state.

3. The system of claim 2, wherein the vehicle comprises an electric aircraft, wherein the vehicle controller is configured to control a rotor of the electric aircraft.

4. The system of claim 1, further comprising a second vehicle navigation system and a third vehicle navigation system, each communicatively connected to the first vehicle navigation system.

5. The system of claim 4, wherein the previous vehicle state is determined from the set of received vehicle states comprising a first, second, and third vehicle state determined at the first, second, and third vehicle navigation systems, respectively, for a prior time step.

6. The system of claim 5, further comprising a vehicle controller communicatively connected to the first, second, and third vehicle navigations systems, the vehicle controller configured to determine a vehicle state based on the voting scheme.

7. The system of claim 4, wherein the vehicle defines a sagittal plane separating a left side of the vehicle from a right side of the vehicle, wherein the first vehicle navigation system is located on the left side of the vehicle, wherein the second vehicle navigation system is located on the right side of the vehicle.

8. The system of claim 1, wherein: the first sensor subset comprises at least three inertial measurement units, wherein the second sensor subset comprises at least three inertial measurement units.

9. The system of claim 1, wherein the first sensor subset comprises a first magnetometer, first barometer, and first inertial measurement unit, wherein the second sensor subset comprises a second magnetometer, second barometer and second inertial measurement unit.

10. The system of claim 9, wherein single motion model outputs predictions for linear acceleration and angular velocity.

11. The system of claim 10, wherein the single motion model further outputs angular acceleration.

12. The system of claim 1, wherein the set of contextual vehicle data measurements comprises air data.

13. A method for vehicle control, comprising:
determining a vehicle state prediction based on a single motion model and a previous vehicle state;
receiving a set of contextual measurements from a plurality of sensors, the plurality of sensors comprising: a first sensor subset and a second sensor subset, the second sensor subset redundant with the first sensor subset, wherein the plurality of sensors comprises inertial sensors and non-inertial sensors;
for each measurement in the set of contextual measurements, determining a measurement prediction with the vehicle state prediction;
detecting a measurement fault within the set of contextual measurements based on the measurement prediction and, in response to detecting a measurement fault, updating the set of contextual measurements; and
determining an updated vehicle state with the vehicle state prediction, the set of contextual measurements, and an observation model.

14. The method of claim 13, further comprising:
determining a voted vehicle state from a set of updated vehicle states by a voting scheme; and
controlling the vehicle based on the voted vehicle state.

15. The method of claim 13, further comprising:
determining a measurement covariance for each the plurality of sensors, the measurement covariance decoupled from a vehicle state covariance update; and
modifying the observation model based on the measurement covariance for each of the plurality of sensors.

16. The method of claim 15, wherein the measurement covariance is determined independently for at least one gyroscope and at least one accelerometer.

17. The method of claim 13, wherein the inertial sensors comprise a number (N) of inertial sensors, the wherein updating the set of contextual measurements comprises removing a maximum of N/2-1 measurements from the N inertial sensors.

18. The method of claim 13, wherein detecting a measurement fault comprises: comparing a sensor measurement to a mean measurement of the first sensor subset.

19. The method of claim 13, wherein the single motion model uses a subset of sigma points computed from only one side of a distribution relative to an operating point.

20. The method of claim 13, wherein the vehicle state prediction comprises an attitude prediction.

* * * * *